(12) United States Patent
Nakatsu et al.

(10) Patent No.: US 6,324,158 B1
(45) Date of Patent: *Nov. 27, 2001

(54) DISK CARTRIDGE

(75) Inventors: Kimihide Nakatsu; Kazuo Mori; Akihiro Fukasawa; Yoshinobu Ishida, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/807,143

(22) Filed: Feb. 27, 1997

(30) Foreign Application Priority Data

Feb. 28, 1996 (JP) .................................... 8-041558

(51) Int. Cl.⁷ .............................. G11B 3/70; G11B 23/02
(52) U.S. Cl. ............................................ 369/291; 360/132
(58) Field of Search ..................... 369/291, 289, 369/292, 77.2, 137; 360/133, 132; 220/214, DIG. 34; 206/807

(56) References Cited

U.S. PATENT DOCUMENTS

| | | | |
|---|---|---|---|
| 4,482,991 | * 11/1984 | Kawamura et al. | 369/77.2 |
| 4,658,955 | * 4/1987 | Eichner | 206/307 |
| 4,805,769 | * 2/1989 | Soltis et al. | 206/309 |
| 4,926,411 | * 5/1990 | Ouwerkerk et al. | 369/291 |
| 5,150,354 | * 9/1992 | Iwata et al. | 369/291 |
| 5,175,726 | * 12/1992 | Imokawa | 369/291 |
| 5,187,622 | * 2/1993 | Watanabe | 360/99.02 |
| 5,757,764 | 5/1998 | Tanaka | 369/291 |
| 5,854,777 | 12/1998 | Kawamura et al. | 369/59 |
| 5,917,803 | * 6/1999 | Goto et al. | 369/291 |

FOREIGN PATENT DOCUMENTS

| | | |
|---|---|---|
| 2128385A | 5/1990 | (JP) . |
| 2128286 | 10/1990 | (JP) . |
| 404157686 A | * 5/1992 | (JP) . |
| 5290539A | 11/1993 | (JP) . |

* cited by examiner

Primary Examiner—Dung C. Dinh

(57) ABSTRACT

A disk cartridge has a case including a first planar portion and a second planar portion which are disposed opposite to each other with a given spacing therebetween, and a plurality of walls which join the first planar portion and the second planar portion together. The case contains an information carrying disk in a rotatable manner and has an opening formed in one of the walls through which the disk can be inserted or removed. The disk cartridge has a lid mounted on the case for opening or closing the opening. The lid is formed so that an outer surface of the lid is located inside an outer surface of the wall in which the opening is formed.

10 Claims, 19 Drawing Sheets

DISK CARTRIDGE

BACKGROUND OF THE INVENTION

The present invention relates to a disk cartridge which contains an information carrying disk such as an optical disk or a magneto-optical disk in a manner to permit its insertion and removal.

A conventional disk cartridge which is commercially available in the trade name of "electronic book" is illustrated in FIG. 34 to FIG. 38. Specifically, FIG. 34 is a plan view of an upper side of the disk cartridge (corresponding to A-side of the disk), FIG. 35 is a plan view of the upper side, illustrating the manner of opening a shutter of the disk cartridge shown in FIG. 34, and FIG. 36 is a plan view of a lower side (corresponding to B-side of the disk), illustrating the manner of opening the shutter of the disk cartridge shown in FIG. 34. Further, FIG. 37 is a cross section of the disk cartridge shown in FIG. 34 taken along the line $S_{37}$—$S_{37}$ shown in FIG. 34, and FIG. 38 is a plan view illustrating a manner of removing the disk from the disk cartridge shown in FIG. 34 by opening a lid of the cartridge.

As shown in FIG. 34 to FIG. 38, a conventional disk cartridge includes a case 1 which contains a disk 5 in a rotatable manner. The case 1 includes an upper member 2 and a lower member 3 which are disposed opposite to each other with a given spacing therebetween to define a space 4 in which the disk 5 is received. The upper member 2 includes an upper planar portion 6 of the case 1, and a part of the walls 7, 8, 9 and 10 of the case 1, which substantially correspond to one-half thereof. Similarly, the lower member 3 includes a lower planar portion 11 of the case 1, and a part of the walls 7, 8, 9 and 10 of the case 1, which substantially correspond to one-half thereof.

The upper member 2 is provided with a window 2a through which information is written into or read from the A-side of the disk 5. Similarly, the lower member 3 is provided with a window 3a through which information is written into or read from the B-side of the disk 5. The case 1 is also provided with a shutter 12 which opens or closes the windows 2a and 3a.

The wall 10 of the case 1 is formed with an opening 13 which permits the disk 5 to be inserted into or removed from the case 1. The case 1 is provided with a lid 14 which opens or closes the opening 13. The lid 14 is supported by the case 1 so as to be pivotable about a pivot 15 in a plane parallel to the upper and the lower planar portions 6 and 11 of the upper and the lower members 2 and 3.

In the conventional disk cartridge as mentioned, the lid 14 is formed with an end face 14a which is located on the outside of the end faces 2b and 3b of the upper and the lower members 2 and 3 so as to cover these end faces 2b and 3b. Accordingly, when a locking mechanism for the lid 14 (not shown in FIG. 34 to FIG. 38) is unlocked to open the lid 14, there is a likelihood that undue forces may be applied to the lid 14 to cause a plastic deformation thereof, thereby degrading the accuracy of the end face 14a of the lid 14. Also, when the lid 14 is closed, if the lid 14 is locked imperfectly, the end face 14a which is urged by a hand assembly of a disk changer mechanism (not shown in FIG. 34 to FIG. 38) assumes a slant position, again degrading the accuracy. Accordingly, in either instance, when the hand assembly of the disk changer mechanism presses the end face 14a of the lid 14 to move the disk cartridge into a record/playback unit, the disk cartridge may be forcibly inserted while the disk cartridge assumes the slant position. In worst cases, the disk cartridge may be jammed within the record/playback unit to disable either insertion or removal of the disk cartridge.

In addition, there is a problem that when removing the disk 5 from the disk cartridge, the information carrying surface of the disk 5 may come into contact with the end faces 2b and 3b or the internal surfaces of the upper and the lower members 2 and 3, whereby the information carrying surface of the disk 5 may be scarred.

In addition, when inserting the disk 5 into the disk cartridge, dust which is electrostatically attracted or handgrease may be deposited upon the information carrying surface of the disk 5, interfering with or preventing read-out of the information from the disk 5.

The absence of a mechanism which guides the disk 5 when it is to be received within the disk cartridge may cause the disk 5 to be dropped in the course of containing it into the disk cartridge, or cause the information carrying surface of the disk 5 to be brought into contact with the internal surfaces of the case 1, or cause a deposition of the handgrease or the like upon the information carrying surface of the disk 5.

Also absent is a mechanism which detects whether the disk 5 has never been removed from the disk cartridge or whether it has been removed at least once. Accordingly, when it is desired to record information, an operation to distinguish whether or not a normal recording operation is possible or an operation to verify the format of the disk 5 must be executed before a record operation can be initiated, increasing the length of time required for the record operation.

Finally, the opening 13 of the disk cartridge is of a size which permits a plurality of varieties of disks such as MD (trade name: mini-disk) or disk used as an electronic book to be directly inserted into the disk cartridge, presenting a problem that a different type of disk other than intended may be inadvertently inserted into the disk cartridge.

SUMMARY OF THE INVENTION

It is therefore an object of the present invention to provide a disk cartridge which allows a disk changer mechanism to move a disk into a record/playback unit in a proper stabilized position in the event a lid undergoes a plastic deformation.

It is another object of the present invention to provide a disk cartridge which eliminates the likelihood of scarring an information carrying surface of the disk during the insertion or the removal of the disk.

It is still another object of the present invention to provide a disk cartridge which is capable of removing deposited dust or marring by grease on the disk which is inserted into the disk cartridge.

It is a yet another object of present invention to provide a disk cartridge which eliminates the need to hold the disk by hand during the insertion of the disk into the disk cartridge.

It is a further object of the present invention to provide a disk cartridge which enables the detection of whether the disk has ever been removed from the disk cartridge or whether it has been removed at least once, thereby allowing the length of time required for the information recording operation to be reduced.

It is a still further object of the present invention to provide a disk cartridge which prevents the insertion of the disk having a different configuration.

According to one aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having an opening formed in one of the walls through which the disk can be inserted or removed; and a lid mounted on the case for opening or closing the opening, the lid being formed so that an outer surface of the lid is located inside an outer surface of the wall in which the opening is formed.

According to another aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having opening in one of the walls through which the disk can be inserted or removed; a lid mounted on the case for opening or closing the opening; and at least two projections formed on an outer surface of the lid and having an equal height, the outer surface of the lid being parallel to the wall in which the opening is formed.

According to a still another aspect of the present invention, a disk cartridge has a case including a first planar portion and a second planar portion which are disposed opposite to each other with a given spacing therebetween, and a plurality of walls which join the first planar portion and the second planar portion together, the case containing a disk, which has an annular first projection adjacent to an outer periphery of the disk on an information carrying surface of the disk, in a rotatable manner; and a second projection formed on at least one of internal surfaces of the first planar portion and the second planar portion in a region located opposite to the first projection and adapted to abut against the first projection.

According to a yet another aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having an opening formed in one of the walls through which the disk can be inserted or removed; a lid mounted on the case for opening or closing the opening; and a cleaning member mounted on at least one of internal surfaces of the first planar portion and the second planar portion so as to face an information carrying surface of the disk, thereby being in contact with the information carrying surface of the disk when the disk is inserted into or removed from the case.

According to a further aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having an opening formed in one of the walls through which the disk can be inserted or removed; a lid mounted on the case for opening or closing the opening; support means for supporting the lid so as to be capable of rotating in a plane parallel to the first planar portion and the second planar portion; and a holding groove formed inside the lid to permit an outer periphery of the disk to be fitted therein.

According to a still another aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having an opening formed in one of the walls through which the disk can be inserted or removed; a lid mounted on the case for opening or closing the opening; a penetration formed in the second planar portion; a projection projecting from an inside of the case and having a smaller diameter than the penetration; and a recess formed in the lid for engaging the projection when the lid is closed and operable to sever the projection when the lid is opened, thereby causing the projection to be discharged outside the case through the penetration.

According to another aspect of the present invention, a disk cartridge has a case including a first planar portion and a second planar portion which are disposed opposite to each other with a given spacing therebetween, and a plurality of walls which join the first planar portion and the second planar portion together, the case containing an information carrying disk in a rotatable manner and having an opening formed in one of the walls through which the disk can be inserted or removed; a lid mounted on the case for opening or closing the opening; and an insertion restriction part projecting from at least one of internal surfaces of the first planar portion and the second planar portion for reducing a width of the opening substantially equal to a thickness of the disk in a range which does not interfere with an insertion or removal of the disk.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Some embodiments of the present invention will be described with reference to the attached drawings.

First Embodiment

Figure 1A:
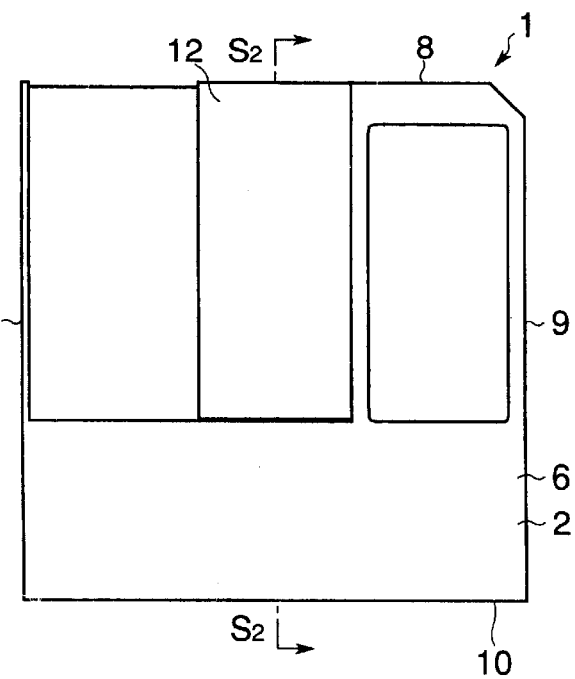
FIG. 1A is a plan view of an upper surface of a disk cartridge according to a first embodiment of the present invention, corresponding to an A-side of the disk.
Figure 1B:
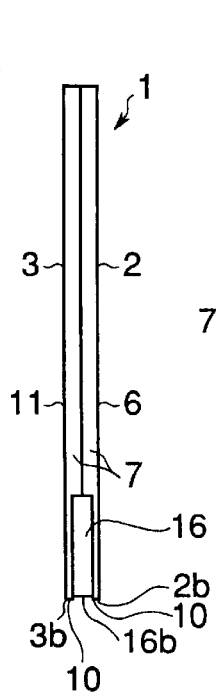
FIGS. 1B–1D are side elevations of a left, a right and a front wall of the disk cartridge shown in FIG. 1A.
Figure 1C:
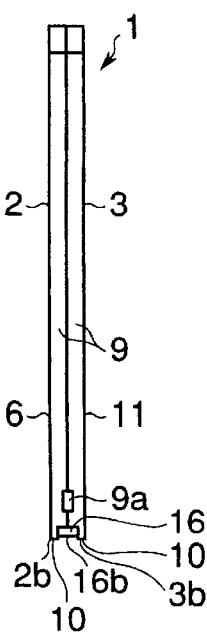
Figure 1D:
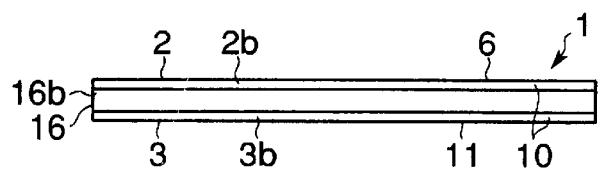
Figure 2:
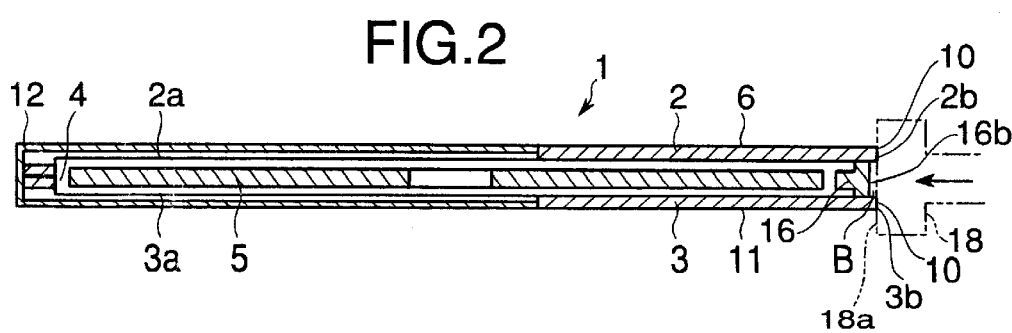
FIG. 2 is a cross section of the disk cartridge shown in FIG. 1A taken along the line $S_2$—$S_2$.
Figure 3:
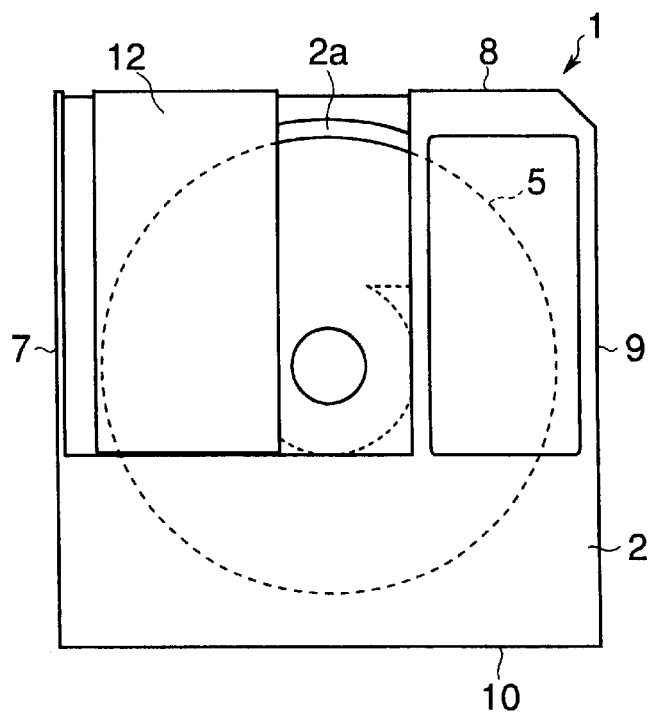
FIG. 3 is a plan view of the disk cartridge shown in FIG. 1A with a shutter open.
Figure 4:
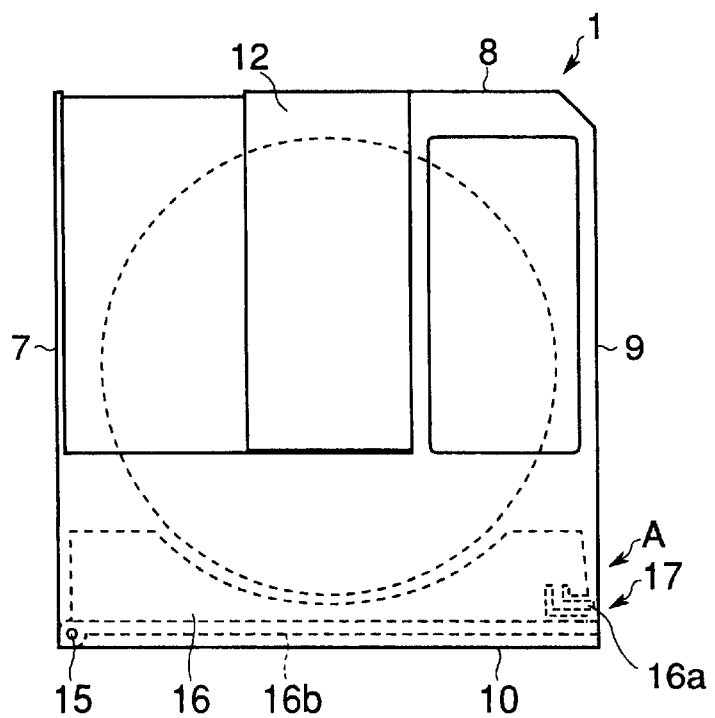
FIG. 4 is a plan view of the disk cartridge when a lid associated with an opening through which the disk is inserted or removed is closed.
Figure 5:
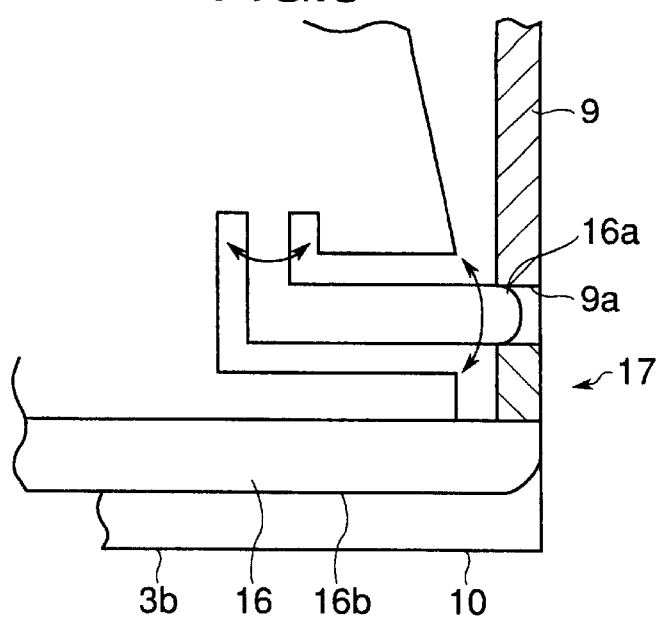
FIG. 5 is a fragmentary enlarged view of an area indicated by a symbol A in FIG. 4.
Figure 6:
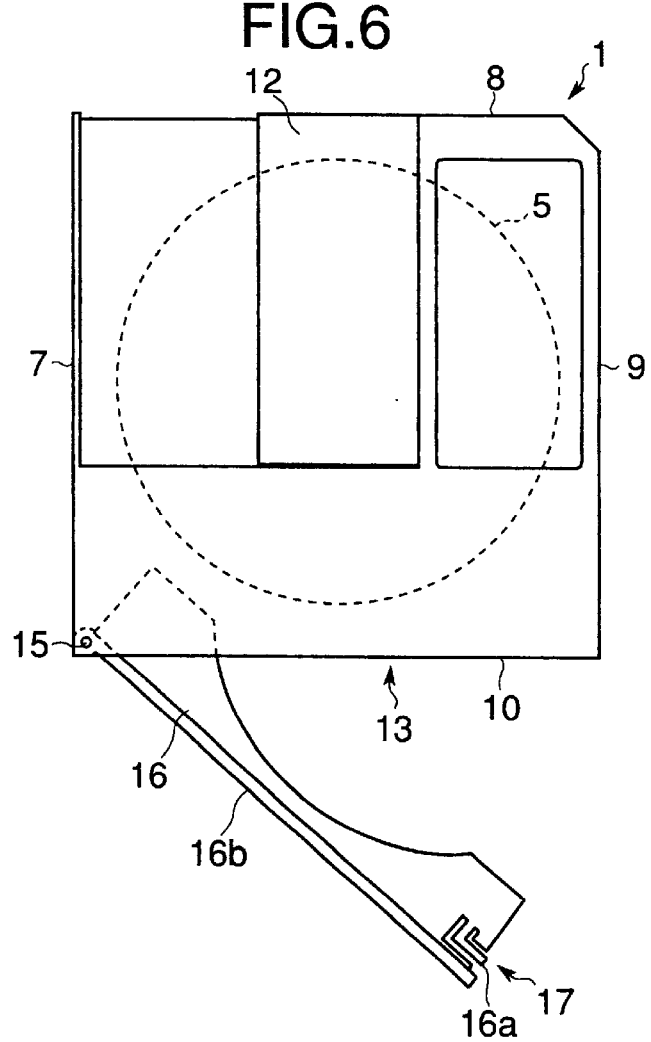
FIG. 6 is a plan view of the disk cartridge of the first embodiment when a lid associated with the opening is opened.

FIGS. 1A to 1D schematically illustrate the configuration of a disk cartridge according to a first embodiment of the present invention, wherein FIG. 1A is a plan view of an upper surface of the disk cartridge corresponding to an A-side of the disk, and FIGS. 1B–1D are side elevations of a left, a right and a front wall of the disk cartridge shown in FIG. 1A. FIG. 2 is a cross section of the disk cartridge shown in FIG. 1A taken along the line $S_2$—$S_2$ shown in FIG. 1A, FIG. 3 is a plan view of the disk cartridge shown in FIG. 1A with a shutter open, FIG. 4 is a plan view of the disk cartridge when a lid associated with an opening through which the disk is inserted or removed is closed, FIG. 5 is a fragmentary enlarged view of an area indicated by a symbol A in FIG. 4, and FIG. 6 is a plan view of the disk cartridge of the first embodiment when a lid associated with the opening is opened.

Referring to FIGS. 1A–1D and FIG. 2 to FIG. 6, the disk cartridge according to the first embodiment includes a case 1 which contains a disk 5 such as an optical disk or a magneto-optical disk in a rotatable manner. The case 1 is formed of, for example, a plastic material, but may be formed of different material such as metal as well.

The case 1 includes an upper member 2 and a lower member 3 which are disposed opposite to each other with a given spacing therebetween to define a space 4 in which the disk 5 is received. The upper member 2 includes an upper planar portion 6 constituting an upper side of the case 1, corresponding to the A-side of the disk 5, and a part of substantially one-half of walls 7, 8, 9 and 10 forming the case 1. Similarly, the lower member 3 includes a lower planar portion 11 constituting a lower side of the case 1, corresponding to the B-side of the disk 5, and a part of substantially one-half of the wall 7, 8, 9 and 10 forming the case 1. The upper member 2 and the lower member 3 are bonded together by an adhesive, for example. However, it should be understood that the case 1 need not be formed of a pair of members such as the upper member 2 and the lower member 3, but may be formed of three of more members. Alternatively, the case 1 may be integrally formed from a single member.

The upper member 2 is provided with a window 2a through which information is written into or read from the A-side of the disk 5. Similarly, the lower member 3 is provided with a window 3a through which information is written into or read from the B-side of the disk 5. The case 1 is provided with a shutter 12 which opens or closes the windows 2a and 3a. As shown in FIG. 2, the shutter 12 is substantially U-shaped. The shutter 12 is constructed with a metal, for example. As shown in FIG. 1A and FIG. 3, the shutter 12 is mounted so as to be slidable with respect to the case 1.

The wall 10 of the case 1, or the end face of the case 1 which is located opposite from the shutter 12 is formed with an opening 13 through which disk 5 may be inserted or removed. In the first embodiment, the wall 10 of the case 1 has an end face 2b of the upper member 2 and an end face 3b of the lower member 3. It is to be noted that the end face 2b of the upper member 2 and the end face 3b of the lower member 3 are disposed so as to be co-planar, or be aligned with each other as viewed in FIGS. 1A, 1B and 1C.

Referring to FIG. 4 and FIG. 6, the case 1 is provided with a lid 16 which opens or closes the opening 13. The lid 16 is supported on the case 1 by means of a pivot 15 so as to be capable of pivotable motion in a plane parallel to the planar portions 6 and 11 in a region located between the upper planar portion 6 of the upper member 2 and the lower planar portion 11 of the lower member 3. The pivot 15 may have a pair of projections which are integrally formed on the opposite surfaces of the lid 16 and which are rotatably engaged with recesses, not shown, formed in the internal surfaces of the planar portion 6 of the upper member 2 and the planar portion 11 of the lower member 13 adjacent to one corner of the case 1. However, the construction of the pivot 15 is not limited to the one just mentioned, and alternatively, the lid 16 may be supported by an engagement between the projections formed on the internal surfaces of the planar portions 6 and 11, and recesses in the opposite surfaces of the lid 16. As a further alternative, the lid 16 may be rotatably supported by a shaft, not shown, serving as the pivot 15, which is fixedly mounted on the internal surfaces of the planar position 6 of the upper member 2 and the planar portion 11 of the lower member 3.

As shown in FIG. 4 to FIG. 6. the disk cartridge includes a locking mechanism 17 which detains the lid 16 to the case 1 when the lid 16 is closed. The locking mechanism 17 has a hole 9a which is formed in the wall 9 of the case 1, and a projection 16a formed on the lid 16 and engaging the hole 9a when the lid 16 is closed. However, it should be understood that the construction of the locking mechanism 17 is not limited to the precise construction mentioned above, but may comprise a projection formed on the wall 9 of the case 1 and a recess formed in the lid 16.

As shown in FIGS. 1A–1D, FIG. 2, FIG. 4 and FIG. 5, in the disk cartridge according to the first embodiment, the outer surface 16b of the lid 16 is formed so as to be located inside the outer surface of the wall 10 in which the opening 13 is formed when the lid 16 is closed.

With the disk cartridge constructed in a manner mentioned above, when it is desired to remove the disk 5 from the disk cartridge, the locking mechanism 17 is unlocked as by pushing the projection 16a of the lid 16 from the outside of the hole 9a using a tool having a pointed end, thus causing the lid 16 to rotate about the pivot 15 and thus opening the opening 13 to allow the disk 5 to be removed. Conversely when the disk 5 is to be inserted into the disk cartridge, the disk 5 is inserted through the opening 13 with the lid 16 maintained in its open condition, and then the lid 16 is rotated toward the case 1, followed by pushing the lid 16 towards the case 1. Thereupon, the projection 16a of the lid 16 abuts against the end of the wall 9, and subsequently moves into the case 1 while abutting against the internal surface of the wall 9 and while undergoing slight elastic deformation, which is eliminated by engaging the hole 9a in the case 1.

When the described disk cartridge is to be used with a record/playback unit, not shown, which is provided with a disk changer mechanism, an operation which causes the disk cartridge to be loaded into the disk changer mechanism to move into record/playback position takes place as follows:

Referring to FIG. 2, a hand assembly 18 of the disk changer mechanism is brought into abutment against the wall 10 of the case 1 of the disk cartridge, applying a force to the wall 10 acting in the direction indicated by an arrow, thus moving the disk cartridge. Thus, when the disk cartridge of the first embodiment is brought to its record/playback position by means of the disk changer mechanism, the wall 10 of the case 1 of the disk cartridge, which is defined by the combination of the end face 2b of the upper member 2 and the end face 3b of the lower member 3, is pushed for movement.

As discussed, with the disk cartridge according to the first embodiment, the lid 16 is located between the upper member 2 and the lower member 3, and accordingly, no undue forces which would result from the opening and the closing of the lid 16 cannot be directly applied to the end faces 2b and 3b of these members 2 and 3, thus preventing the likelihood that a plastic deformation is caused to these end faces 2b and 3b. Hence, the relative position between the end faces 2b and 3b is maintained constant. In addition, since there is no chance that a deformation is caused to the end faces 2b and 3b themselves, the accuracy of these end faces 2b and 3b can be maintained intact from their initial condition, whereby a contact with a pushing surface 18a of the hand assembly 18 can be maintained in a good condition. In this manner, with the disk cartridge according to the first embodiment, an inconvenience is prevented that the disk cartridge may be forcibly inserted into the record/playback position with its leading edge (corresponding to its end face 8) either raised or lowered, causing a jamming within the record/playback unit to make the insertion or removal of the disk cartridge impossible in worst cases.

In the event the locking operation by the locking mechanism 17 is imperfect when the lid 16 is closed, the hand assembly 18 pushes the wall 10 of the case 1 rather than the end face 16b of the lid 16 since the end face 16b of the lid 16 does not project beyond the wall 10 of the case 1 (or end faces 2b and 3b). Accordingly, with the disk cartridge according to the first embodiment, a slant position of the disk cartridge which may result from the hand assembly 18 pressing against the lid 16 which assumes a half-open position can be prevented from occurring. In this manner, an inconvenience can be prevented that the disk cartridge be forcibly inserted into the record/playback position or it may become jammed within the record/playback unit to disable its insertion or its removal in worst cases.

Second Embodiment

Figures 7A, 7B, 7C:
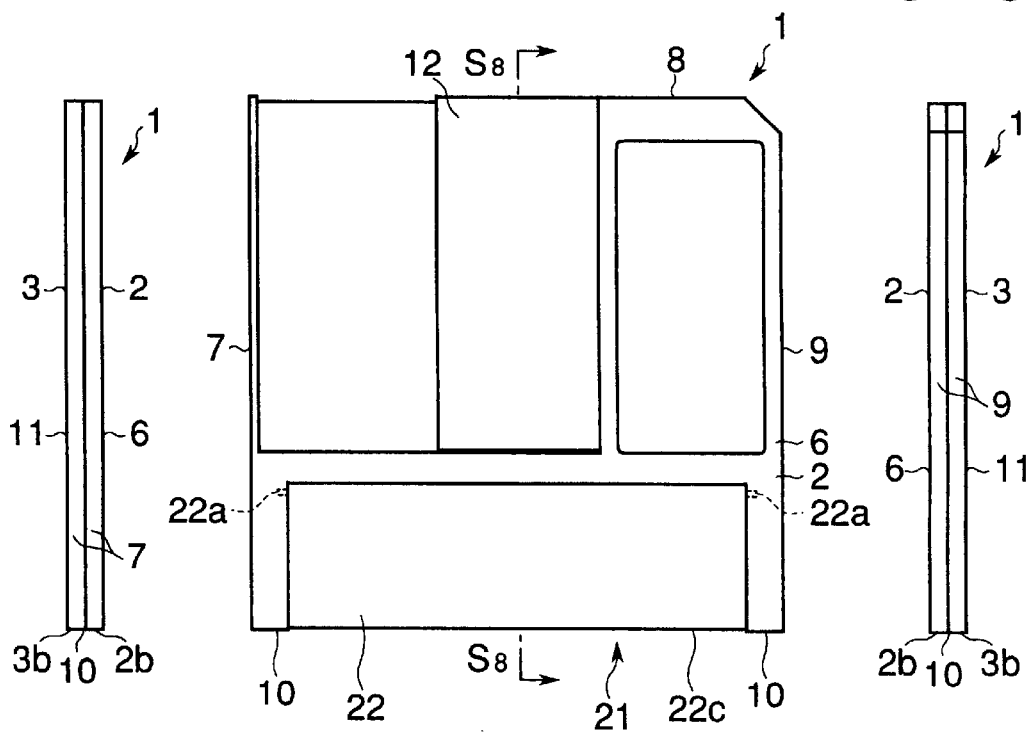
FIG. 7A is a plan view of an upper surface of a disk cartridge according to a second embodiment of the present invention, corresponding to an A-side of the disk.
FIGS. 7B–7D are side elevations of a left, a right and a front wall of the disk cartridge shown in FIG. 7A.
Figure 7D:
Figure 8:
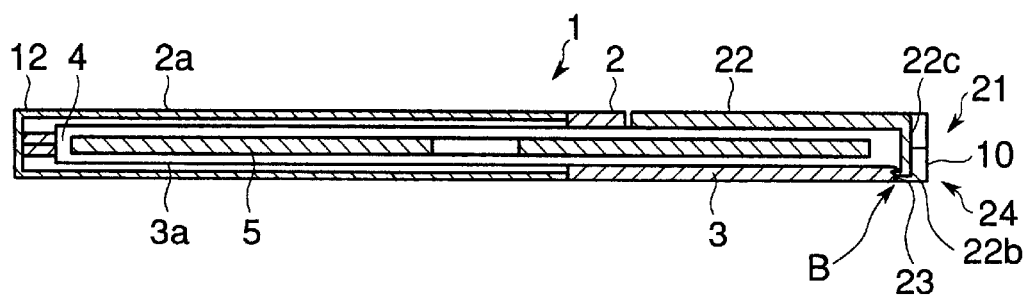
FIG. 8 is a cross section of the disk cartridge shown in FIG. 7A taken along the line $S_8$—$S_8$.
Figure 9:
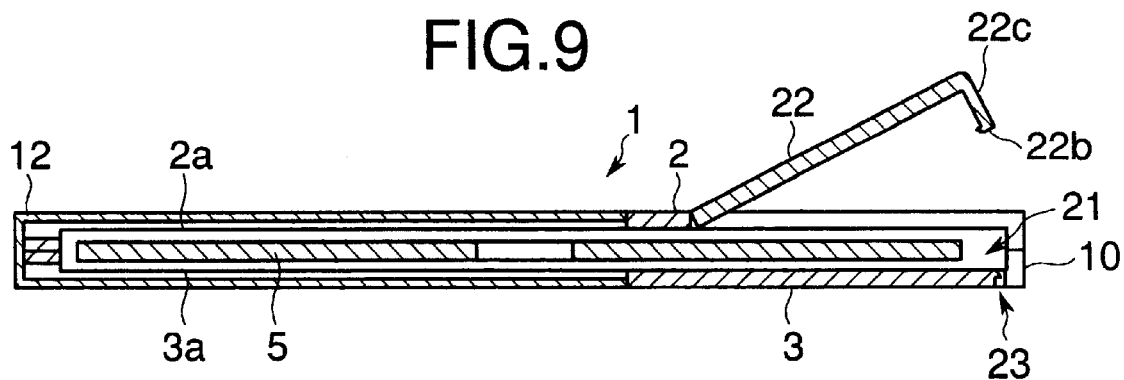
FIG. 9 is a cross section of the disk cartridge of the second embodiment when the lid associated with the opening is opened.

FIGS. 7A–7D schematically illustrate the configuration of a disk cartridge according to a second embodiment of the present invention, wherein FIG. 7A is a plan view of an upper surface of the disk cartridge corresponding to the A-side of the disk, and FIGS. 7B–7D are side elevations of a left, a right and a front wall of the disk cartridge shown in FIG. 7A. FIG. 8 is a cross section of the disk cartridge shown in FIG. 7A taken along the line $S_8$—$S_8$. FIG. 9 is a cross section of the disk cartridge when the lid associated with the opening is opened, FIG. 10 is a plan view of the disk cartridge shown in FIG. 7A when the shutter is opened, and FIG. 11 is a fragmentary enlarged view of an area indicated by a symbol B in FIG. 8.

Throughout FIGS. 7A–7D, and FIG. 8 to FIG. 11, parts identical or corresponding to those shown in the first embodiment are designated by the same reference numerals or characters as used before.

Referring to FIGS. 7A–7D, and FIG. 8 to FIG. 11, the disk cartridge according to the second embodiment differs from the disk cartridge of the first embodiment with respect to of the configuration of an opening 21 formed in the case 1 and the construction of a lid 22 which opens or closes the opening 21.

Figure 10:
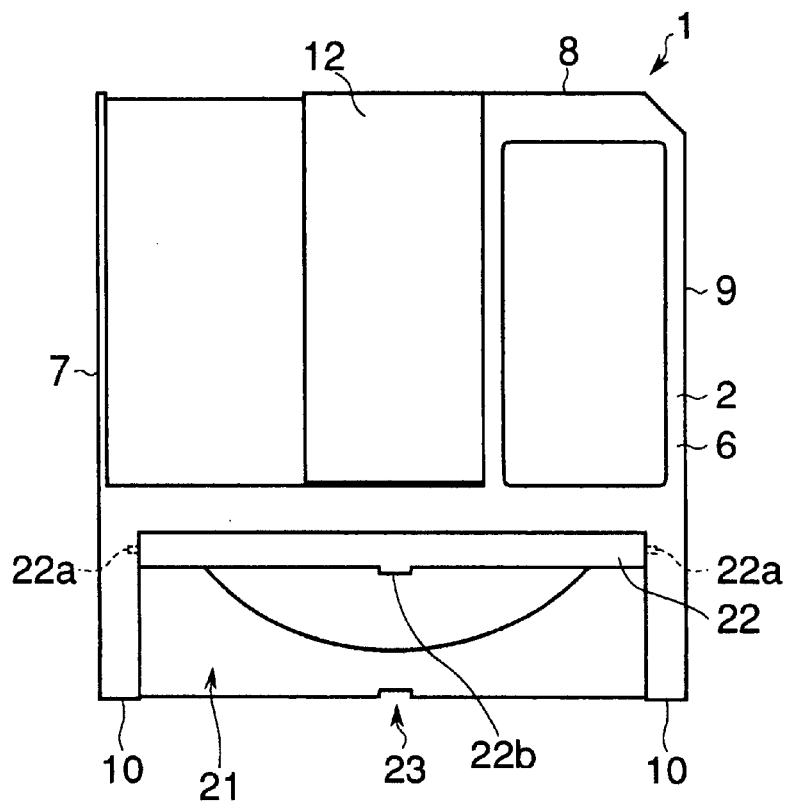
FIG. 10 is a plan view of the disk cartridge shown in FIG. 7A when the shutter is opened.
Figure 11:
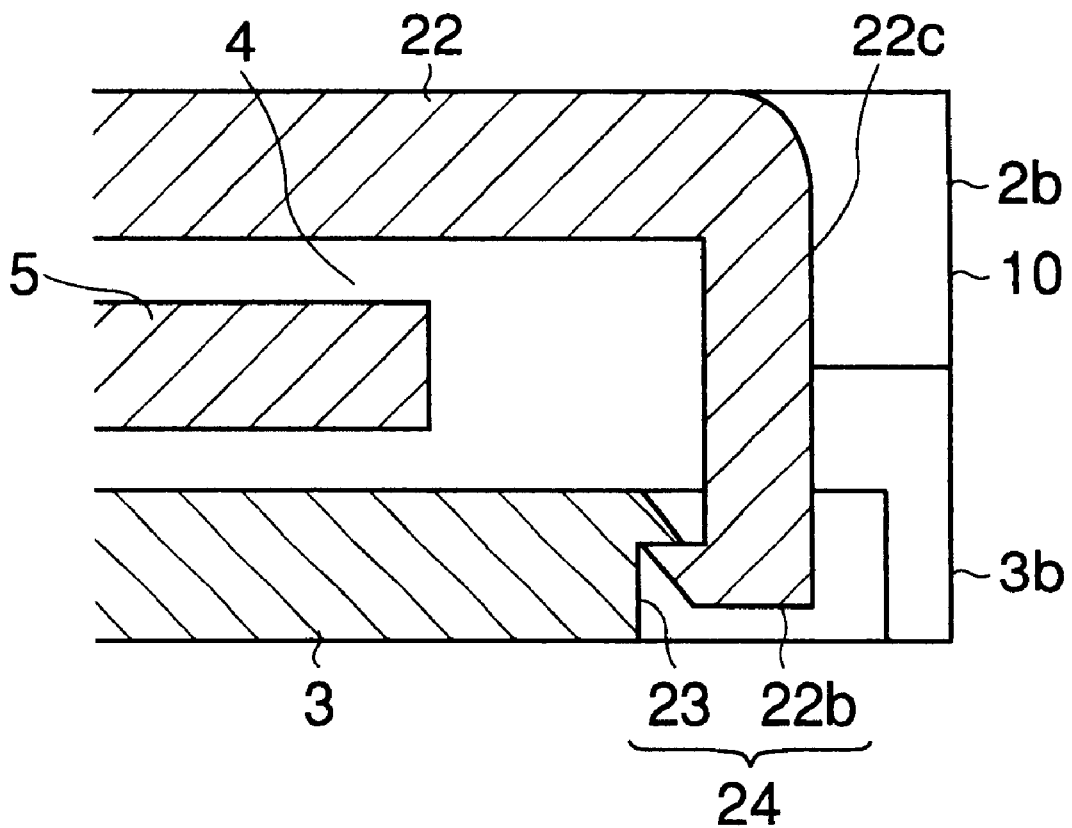
FIG. 11 is a fragmentary enlarged view of an area indicated by a symbol B in FIG. 8.

As best shown in FIG. 9 and FIG. 10, the opening 21 in the second embodiment extends not only through the wall 10 of the case 1, but also into the planar portion 6 of the upper member 2.

In addition, in the disk cartridge of the second embodiment, a notch 23 is formed at the center of the wall 10 of the lower member 3, while a hook 22b is formed on the distal end of the lid 22 for engaging the notch 23, as shown in FIG. 7D and FIG. 8 to FIG. 11. The combination of the hook 22b and the notch 23 constitutes a locking mechanism 24 which locks the lid 22 in the case 1. However, it should be understood that the locking mechanism 24 is not limited to the described construction, but may have a different construction.

The lid 22 has an outer surface 22c, which is located inside the outer surface of the wall 10 of the case 1 when the lid 22 is closed, as shown in FIG. 7A, FIG. 8 and FIG. 11.

With the disk cartridge constructed in the manner mentioned above, when it is desired to remove the disk 5, the hook 22b is pulled by a finger to be disengaged from the notch 23, and the lid 22 may be rotated about a pivot 22a, thus opening the lid 22 to allow the disk 5 to be removed. Conversely, when it is desired to insert the disk 5 into the disk cartridge, the disk 5 is inserted through the opening 21 under the condition that the lid 22 is opened, and then the lid 22 is turned towards the case 1, followed by pushing the lid 22 against the case 1 from above. The hook 22b of the lid 22 then abuts against the upper surface of the notch 23 while undergoing a degree of elastic deformation, which is eliminated when the hook 22b has moved past the notch 23, whereupon the lid 22 is engaged with the notch 23.

When the described disk cartridge is used in a record/playback unit (not shown) which is provided with a disk changer mechanism, the disk cartridge which is loaded into the disk changer mechanism may be brought to a record/playback position, by disposing the hand assembly of the disk changer mechanism in abutment against the wall 10 of the disk cartridge, and applying a force to the wall 10 to move the disk cartridge. Thus, when the disk cartridge of the second embodiment is brought to the record/playback position by the disk changer mechanism, the wall 10 of the disk cartridge is pressed for movement.

With the disk cartridge of the second embodiment, undue forces cannot be directly applied to the end faces 2b and 3b of the upper and the lower member 2 and 3 (or the wall 10) as a result of the opening or closing of the lid 22, and hence there is no likelihood that these end faces undergo a plastic deformations. Hence, the positional relationship between the end faces 2b and 3b is maintained constant, and the surface which is defined by the end faces 2B and 3B cannot undergo the deformation, thus maintaining the accuracy of the surface defined by the end faces 2b and 3b intact as formed at the initial condition. This assures a good contact with the pushing surface of the hand assembly. As a consequence, with a disk cartridge of the second embodiment, an inconvenience can be prevented that the disk cartridge may be forcibly inserted to bring it into record/playback position while it assumes a slant position or that it may be jammed within a record/playback unit to disable the insertion or the removal of the disk cartridge in worst cases.

Additionally, the disk cartridge of the second embodiment has the opening 21 which is formed to a greater size than the conventional one, as shown in FIG. 9 and FIG. 10, thus allowing the disk 5 to be inserted into or to be removed from disk cartridge along an upwardly slant path to facilitate the insertion or the removal of the disk 5. This also avoids the likelihood of bringing the disk 5 into contact with the end faces 2b and 3b of the upper and the lower members 2 and 3 when removing the disk 5, thereby scarring the information carrying surface of the disk 5.

In other respects, the disk cartridge of the second embodiment is the same as that of the first embodiment.

Third Embodiment

Figure 12B:
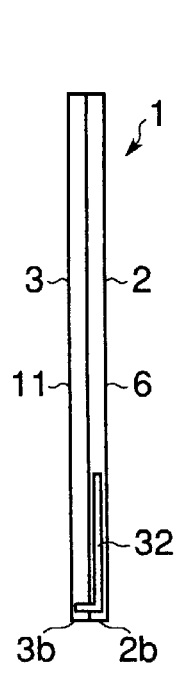
FIGS. 12B–12D are side elevations of a left, a right and a front wall of the disk cartridge shown in FIG. 12A.
Figure 12A:
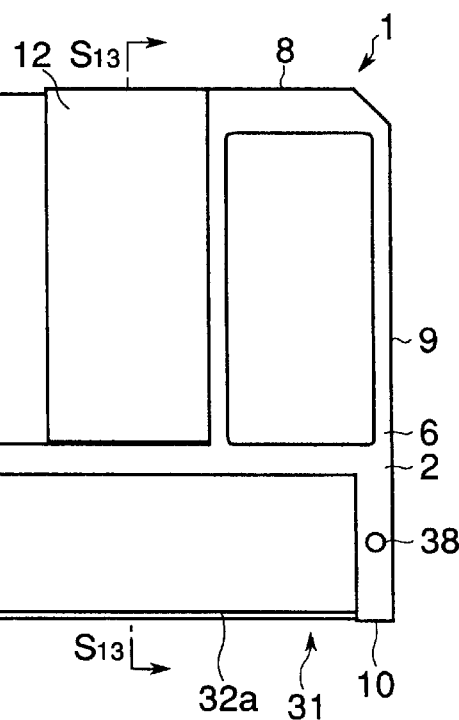
FIG. 12A is a plan view of a upper surface of a disk cartridge according to a third embodiment of the present invention, corresponding to an A-side of a disk.
Figure 12C:
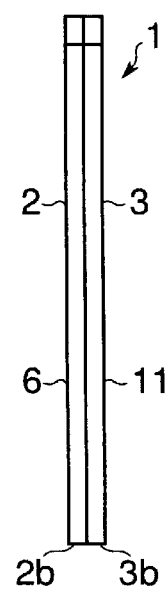
Figure 12D:
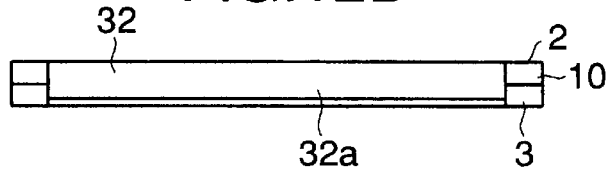
Figure 13:
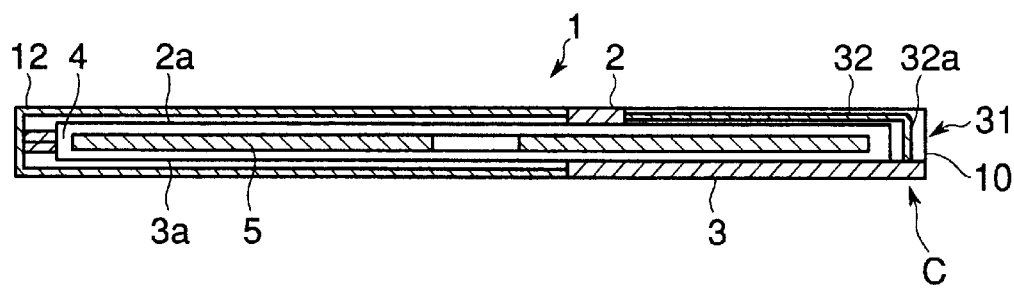
FIG. 13 is a cross section of the disk cartridge shown in FIG. 12A taken along the line $S_{13}$—$S_{13}$.
Figure 14:
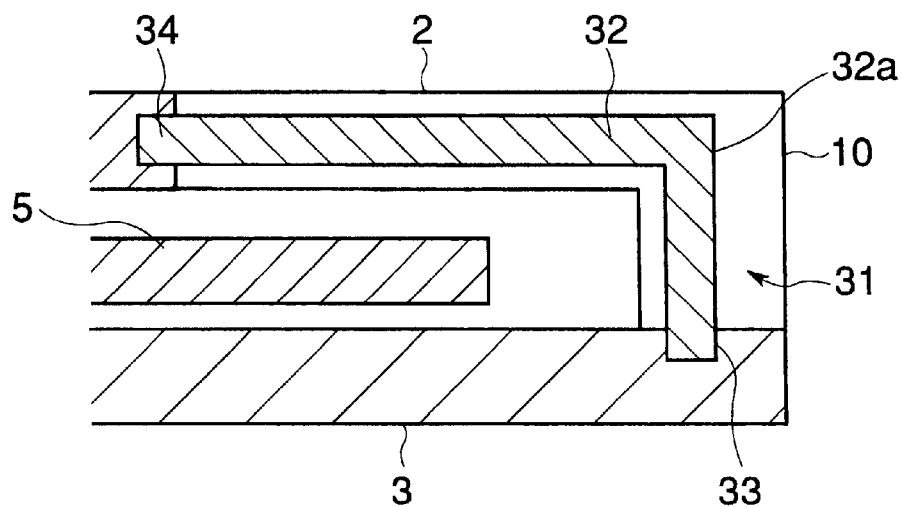
FIG. 14 is a fragmentary enlarged view of an area indicated by a symbol C in FIG. 13.

FIGS. 12A–12B schematically illustrate the configuration of a disk cartridge according to a third embodiment of the present invention, wherein FIG. 12A is a plan view of an upper surface of the disk cartridge corresponding to an A-side of the disk, and FIGS. 12B–12D are side elevations of a left, a right and a front wall of the disk cartridge shown in FIG. 12A. FIG. 13 is a cross section of the disk cartridge shown in FIG. 12A taken along the line $S_{13}$—$S_{13}$, FIG. 14 is a fragmentary enlarged view of an area indicated by a symbol C in FIG. 13, FIG. 15 is a plan view of the disk cartridge when the lid associated with the opening is opened, and FIG. 16 is a side elevation of the disk cartridge shown in FIG. 15 when the shutter is opened.

Throughout FIGS. 12A–12D, and FIG. 13 to FIG. 16, parts identical or corresponding to those shown in the first embodiment are designated by the same reference numerals and characters as used before.

Referring to FIGS. 12A–12D, and FIG. 13 to FIG. 16, the disk cartridge according to the third embodiment differs from that of the first embodiment with respect to of the configuration of an opening 31 formed in the case 1 and the construction of a lid 32 which opens or closes the opening 31.

Figure 15:
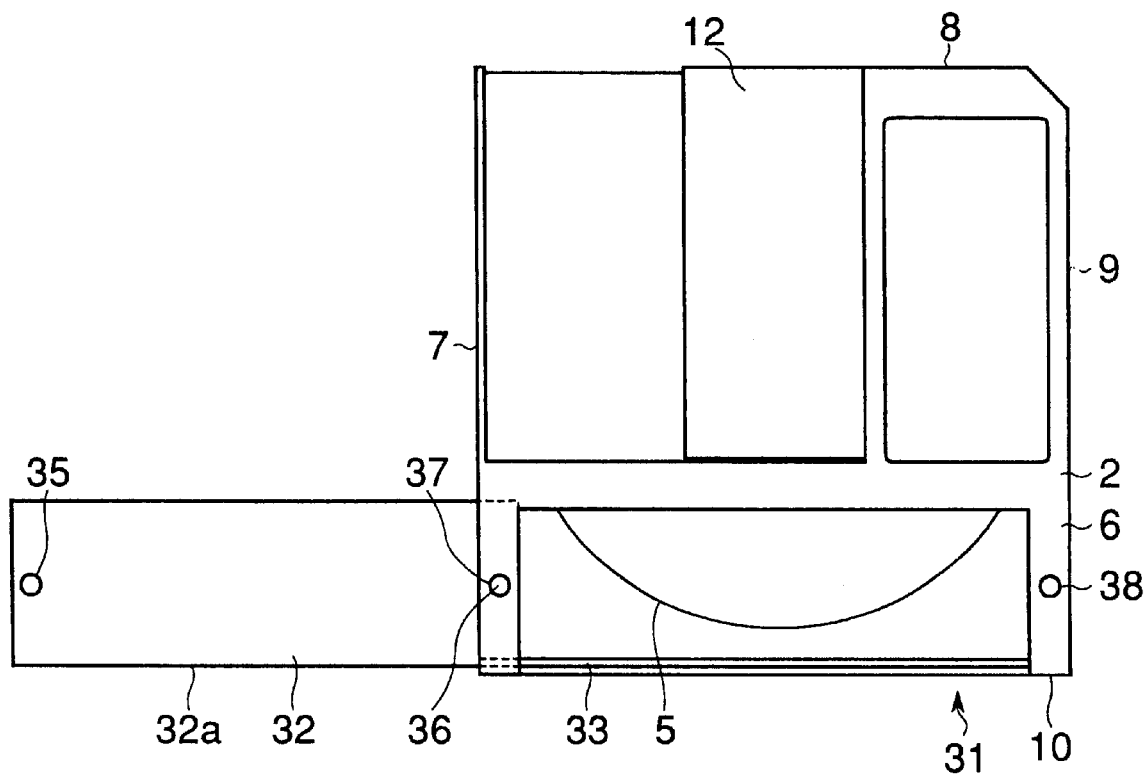
FIG. 15 is a plan view of the disk cartridge of the third embodiment when the lid associated with the opening is opened.
Figure 16:
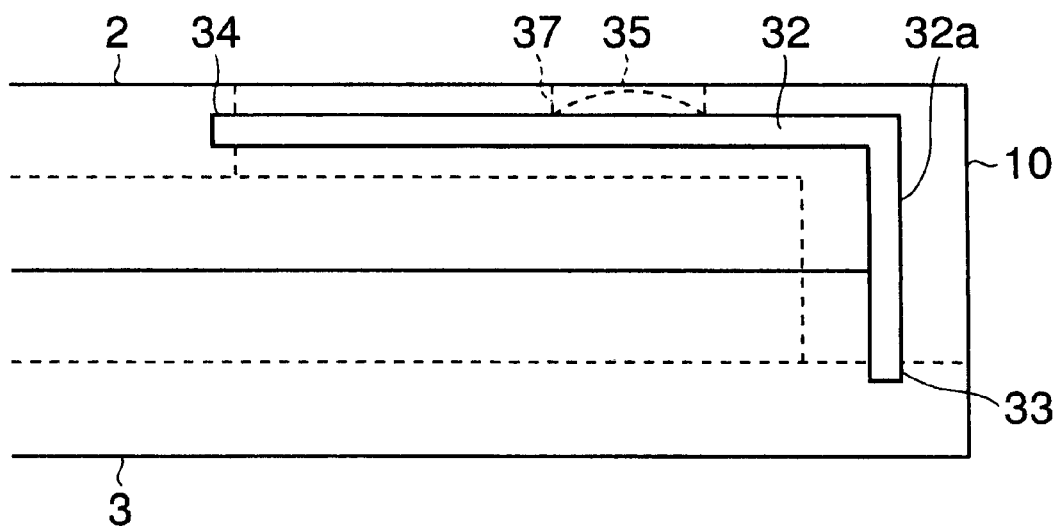
FIG. 16 is a side elevation of the disk cartridge shown in FIG. 15 when the shutter is opened.

As best shown in FIG. 12A and FIG. 15, in the third embodiment, the opening 31 extends not only through the wall 10 of the case 1, but also into the planar portion 6 of the upper member 2.

In the third embodiment, a first rectilinear groove 33 is formed in the internal surface of the lower member 3, as will be noted from FIG. 14 and FIG. 16. A second rectilinear groove 34 is formed in the end face of the upper member 2 as will be noted from FIG. 14. A lid 32 is L-shaped, and has its one end engaged with the first rectilinear groove 33 formed in the lower member 3 and its other end engaged in the second rectilinear groove 34 formed in the upper member 2. The lid 32 opens or closes the opening 31 by sliding movement while maintaining its engagement with the first and the second rectilinear grooves 33 and 34.

As shown in FIG. 15 and FIG. 16, a pair of first and second hemispherical projections 35 and 36 are formed on the upper surface of the lid 32. A pair of first and second holes (or recesses) 37 and 38 are formed in the upper member 2. When the lid 32 is closed, the first and the second projections 35 and 36 engage with the first and the second holes 37 and 38, respectively. On the other hand, when the lid 32 is opened, the second projection 36 engages the first hole 37.

In addition, as shown in FIG. 12A, and FIG. 13 to FIG. 16, in the disk cartridge of the third embodiment, the lid 32 has an outer surface 32a which is located inside the outer surface of the wall 10 in which the opening 31 is formed.

With the disk cartridge constructed in the manner mentioned above, when it is desired to remove the disk 5, the lid 32 is caused to slide along the first and the second rectilinear grooves 33 and 34 until the second projection 36 becomes engaged with the first hole 37, whereupon the disk 5 can be removed through the opening 31. Conversely, when the disk 5 is to be inserted into the disk cartridge, the disk 5 is inserted through the opening 31 while the lid 32 is maintained in its open position, and then the lid 32 is caused to slide along the first and the second rectilinear grooves 33 and 34 until the first and the second projections 35 and 36 become engaged with the first and the second holes 37 and 38, respectively.

When the disk cartridge is used with the record/playback unit (not shown) which is provided with disk changer mechanism, the disk cartridge which is loaded into the disk changer mechanism may be brought to its record/playback position, by disposing a hand assembly of the disk changer mechanism in abutment against the wall 10 of the disk cartridge, thereby applying a force to the wall 10 to move the disk cartridge. Thus, in the third embodiment, when the disk cartridge is moved to the record/playback position by means of the disk changer mechanism, the hand assembly of this mechanism (not shown) presses against the wall 10 of the disk cartridge for its movement.

In the third embodiment described above, undue forces which may result from opening or closing the lid 32 cannot be directly applied to the end face 2b of the upper member 2 and the end face 3b of the lower member 3 (namely, the wall 10), and hence, there is no likelihood that these end faces 2b and 3b undergo a plastic deformation. Accordingly, the positional relationship between the end faces 2b and 3b is maintained constant, and the surface which is defined by these end faces cannot undergo the deformation, whereby the accuracy of the surface defined by these end faces 2b and 3b may be maintained intact as it is at the initial condition. In addition, a good contact with a pushing surface of the hand assembly of the disk changer mechanism is maintained. Accordingly, with the disk cartridge according to the third embodiment, an inconvenience can be prevented that the disk cartridge may be forcibly inserted and brought to its record/playback position while it assumes a slant position or it may be jammed within the record/playback unit to disable its insertion or removal in worst cases.

Finally, as shown in FIG. 15, the case of the disk cartridge according to the third embodiment has its opening 31 formed to be of a greater size than the conventional one, thus allowing the disk 5 to be inserted or removed along an upwardly slant path, thus facilitating the insertion or the removal of the disk 5. Any likelihood that the disk may be brought into contact with the end faces 2b and 3b of the upper and the lower member 2 and 3 to scar the information carrying surface of the disk 5 is eliminated.

In other respects, the construction of the third embodiment is the same as that of the first embodiment described above.

Fourth Embodiment

Figure 17B:
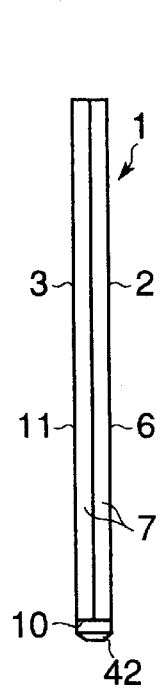
FIGS. 17B–17D are side elevations of a left, a right and a upper wall of the disk cartridge shown in FIG. 17A.
Figure 17A:
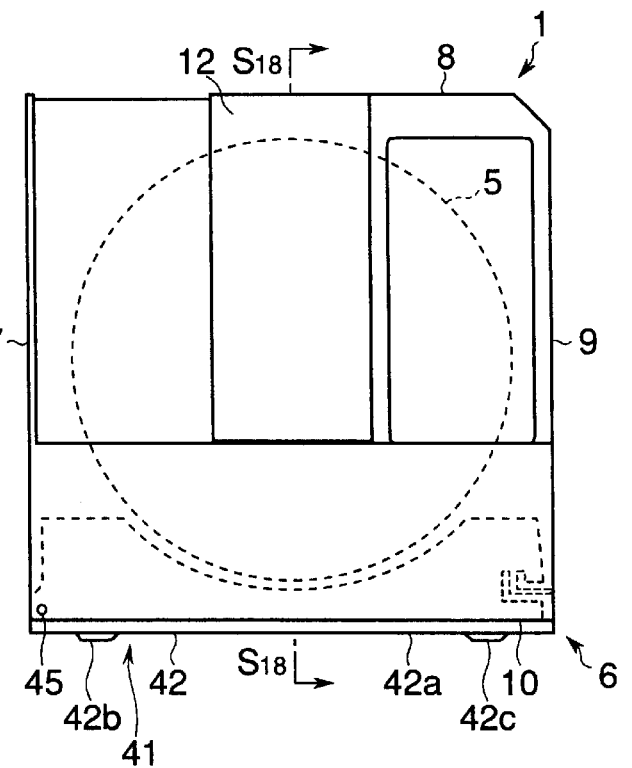
FIG. 17A is a plan view of an upper surface of a disk cartridge according to a fourth embodiment of the present invention, corresponding to an A-side of a disk.
Figure 17C:
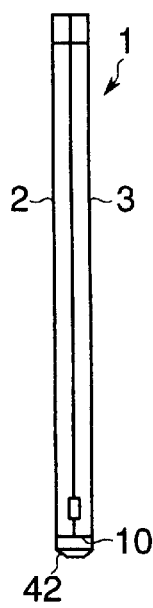
Figure 17D:
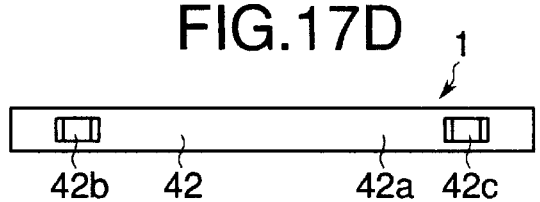
Figure 18:
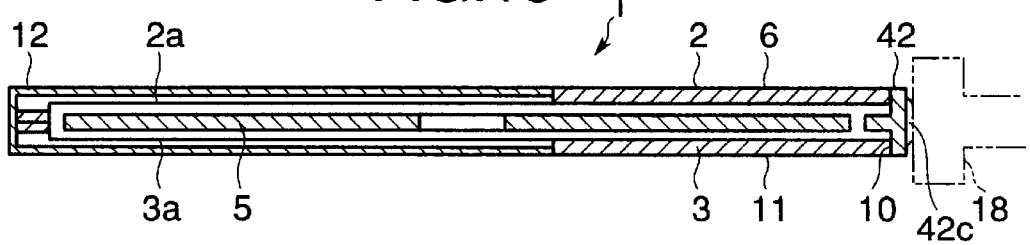
FIG. 18 is a cross section of the disk cartridge shown in FIG. 17A taken along the line $S_{18}$—$S_{18}$.

FIGS. 17A–17D schematically illustrate the configuration of a disk cartridge according to a fourth embodiment of the present invention, wherein FIG. 17A is a plan view of an upper surface of the disk cartridge corresponding to an A-side of the disk, and FIGS. 17B–17D are side elevations of a left, a right and a front wall of the disk cartridge shown in FIG. 17A.

Throughout FIGS. 17A–17D and FIG. 18, parts identical or corresponding to those used in the first embodiment are designated by the same reference numerals and characters as used before.

Referring to FIGS. 17A–17D and FIG. 18, the disk cartridge according to the fourth embodiment differs from the disk cartridge of the first embodiment with respect to the construction of a lid 42 which opens or closes an opening 41 formed in the wall 10 of the case 1.

In the fourth embodiment, the disk cartridge includes the lid 42, which is supported in a rotatable manner by a pivot 45 between the upper member 2 and the lower member 3, in the same manner as in the first embodiment. However, in the disk cartridge of the fourth embodiment, the lid 42 has an end face 42a which is located outside the end faces 2b and 3b of the upper and the lower members 2 and 3, and is formed so as to cover these end faces 2b and 3b. In addition, a pair of projections 42b and 42c are formed on the end face 42a of the lid 42. The projection 42b is formed adjacent to the pivot 45 about which the lid 42 is rotatable, namely, adjacent to a corner where the walls 7 and 10 of the case 1 intersect with each other. The other projection 42c is formed adjacent to another corner where the walls 9 and 10 of the case 1 intersect with each other. It will be noted from FIG. 18 that the projections 42b and 42c represent locations which are pressed by the hand assembly 18 of the disk changer mechanism when the disk cartridge is inserted into a record/playback unit which is provide with a disk changer mechanism. It is to be understood that the number of the projections is not limited to two, but may be three or greater as long as any load applied by the hand assembly 18 cannot cause a deformation of the lid 47. It is desirable that the locations of the projections 42b and 42c be chosen to allow a force applied from the hand assembly 18 to be uniformly transmitted to the case 1.

In the disk cartridge of the fourth embodiment, the projections 42b and 42c are formed on the lid 42 at the locations which are adjacent to corners of the case 1 which are not susceptible to a plastic deformation. Accordingly, if undue stresses are applied to the lid 42 to cause a plastic deformation to degrade the accuracy of the entire end face 42a when the disk cartridge is unlocked to open the lid 42, it is possible to maintain a constant positional relationship between the projections 42b and 42c, and hence the accuracy of the surface defined by these projections. Accordingly, when the disk cartridge is used with the disk changer mechanism to load the case 1 into place within a record/playback unit, the accuracy of the surface defined by the pair of projections 42b and 42c can be maintained intact as it is at the initial condition. Hence as this surface is pressed by the hand assembly 18, it is assured that the disk cartridge can be normally loaded into the record/playback unit.

In other respects, the construction of the fourth embodiment is the same as that of the first embodiment.

Fifth Embodiment

Figure 19:
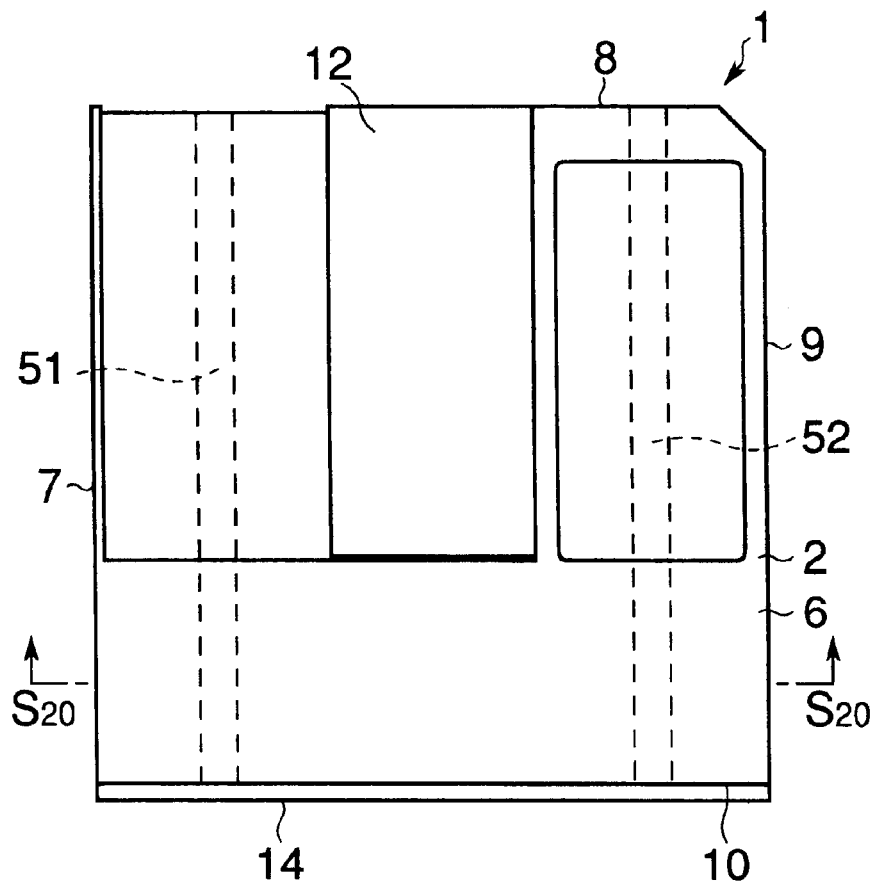
FIG. 19 is a plan view schematically illustrating the configuration of a disk cartridge according to a fifth embodiment of the present invention.
Figure 20:
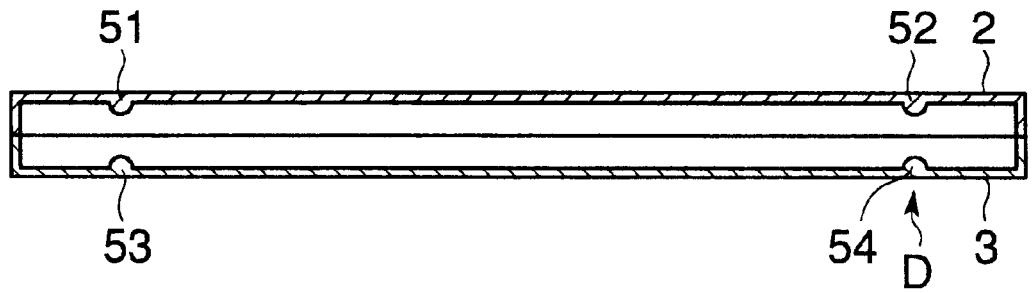
FIG. 20 is a cross section of the disk cartridge shown in FIG. 19 taken along the line $S_{20}$—$S_{20}$.
Figure 21:
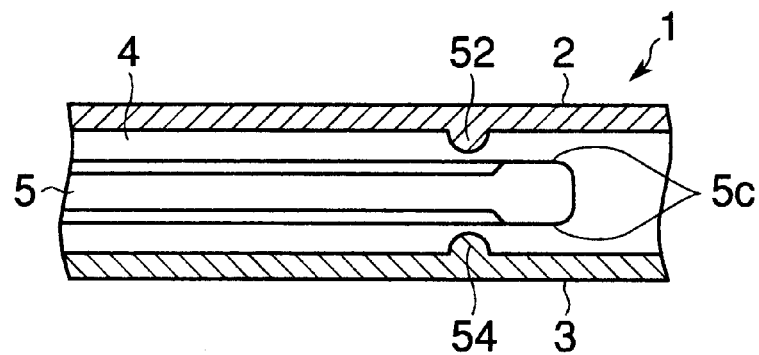
FIG. 21 is an enlarged cross section of an area indicated by a symbol D in FIG. 20.

FIG. 19 is a plan view schematically illustrating the configuration of a disk cartridge according to a fifth embodiment of the present invention, FIG. 20 is a cross section of the disk cartridge shown in FIG. 19 taken along the line $S_{20}$—$S_{20}$, and FIG. 21 is an enlarged cross section of an area indicated by a symbol D in FIG. 20.

Throughout FIG. 19 to FIG. 21, parts identical or corresponding to those shown in FIG. 34 to FIG. 38 (the conventional disk cartridge) are designated by the same reference numerals and characters as used before.

Referring to FIG. 19 to FIG. 21, the disk cartridge according to the fifth embodiment differs from the conventional arrangement shown in FIG. 34 to FIG. 38, only with respect to the provision of rectilinearly extending projections 51, 52, 53 and 54 formed on the internal surfaces of the upper member 2 and the lower member 3, respectively.

It is only necessary that the projections 51–54 be formed on the internal surface or the surfaces of the case 1 in a region which is disposed opposite to at least information carrying surface of the disk 5. It is also desirable that a single projection has a length chosen so that the projections abut against a projecting rim 5c of the disk 5 at two locations. The length is preferably greater than the diameter of the disk 5. In the fifth embodiment, a pair of projections are formed on the internal surface of each of the upper member 2 and the lower member 3. The purpose of these projections 51–54 is to prevent the information carrying surface of the disk 5 from being scarred during the insertion or the removal of the disk 5 into or from the case 1.

As illustrated in FIG. 21, the disk 5 such as an optical disk has an annular rim 5c formed around its outer periphery which has a greater elevation than the information carrying surface of the disk. The rim 5c may contact one or more of the projections 51–54 within the case 1 during the insertion and removal of the disk 5, thus preventing the information carrying surface of the disk 5 from being brought into contact with internal surface of the case 1 to be scarred thereby.

In the above description, the provision of the projections 51–54 has been described in connection with the conventional arrangement shown in FIG. 34 to FIG. 38, but it should be understood that the provision of such projections 51–54 is also applicable to any one of the first to the fourth embodiments mentioned above.

Sixth Embodiment

Figure 22:
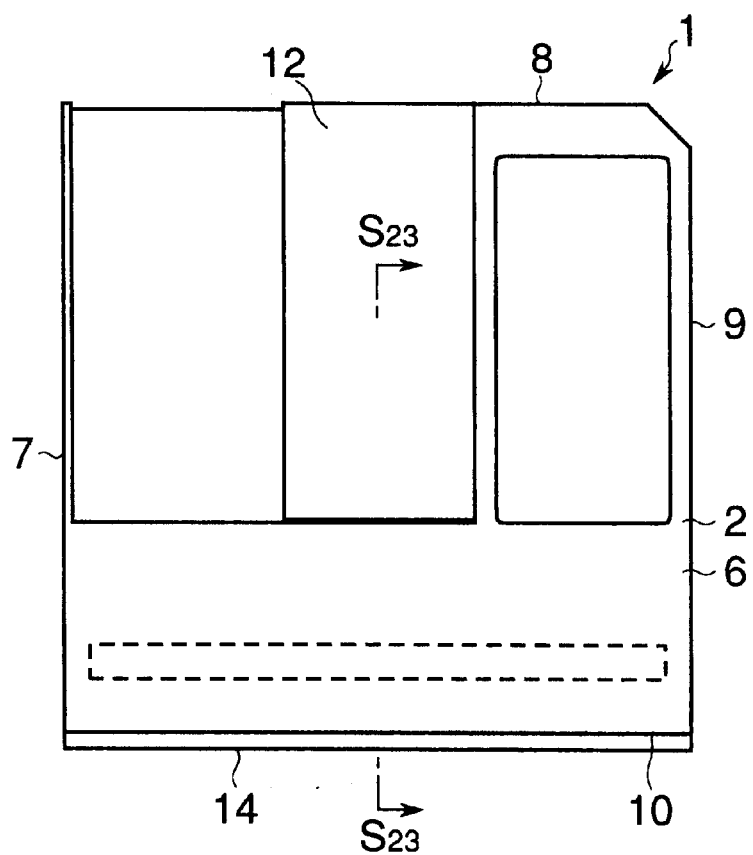
FIG. 22 is a plan view schematically illustrating the configuration of a disk cartridge according to a sixth embodiment of the present invention.
Figure 23:
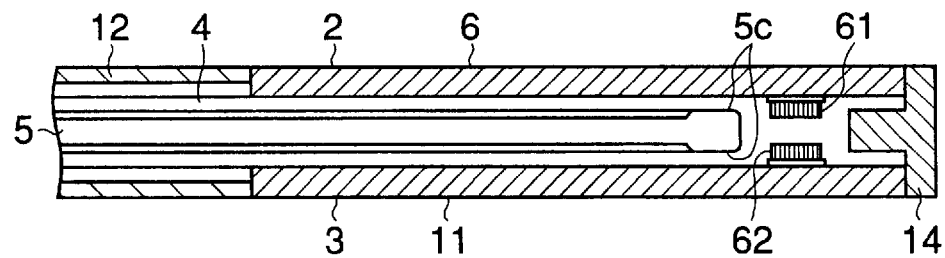
FIG. 23 is an enlarged cross section of the disk cartridge shown FIG. 22 taken along the line $S_{23}$—$S_{23}$.

FIG. 22 is a plan view schematically illustrating the configuration of a disk cartridge according to a sixth embodiment of the present invention, and FIG. 23 is an enlarged cross section of the disk cartridge shown FIG. 22 taken along the line $S_{23}$—$S_{23}$.

Throughout FIG. 22 and FIG. 23, parts identical or corresponding to those used in the conventional arrangement shown in FIG. 34 to FIG. 38 are designated by the same numerals or characters as before.

Referring to FIG. 22 and FIG. 23, the disk cartridge according to the sixth embodiment differs from the conventional arrangement shown in FIG. 34 to FIG. 38 only with respect to a brush 61 and/or 62, serving as a cleaning member disposed on at least one of the internal surfaces of the case 1 and directed towards the information carrying surface of the disk 5 for contact with either surface of the disk 5 during the insertion of the disk 5 into the case 1 or during the removal of the disk 5 from the disk 1. It is to be noted that the brush 61 and/or 62 is located to be kept out of contact with the disk 5 during the rotation thereof, but to assure its contact with the information carrying surface of the disk 5 when the lid 42 is opened to remove the disk 5 or to insert the disk 5.

With a disk cartridge of the sixth embodiment, a contact of the brush 61 and/or 62 with information carrying surface of the disk 5 enables the marring on the information carrying surface as caused by the deposition thereon of dust which is electrostatically attracted, hand-grease or the cigarette nicotine to be removed. Because the removal of the marring which is deposited on the information carrying surface takes place each time the disk 5 is removed and/or inserted, it will be seen that when a disk 5 which is removed from the case 1 is inserted into the case 1 again, the information carrying surface of the disk 5 is maintained in a clean condition, thus minimizing the occurrence of an error during the recording or retrieval of information onto or from the information carrying surface.

It is to be noted that the brush 61 and/or 62 may be replaced by a wet cleaning member, which is more suitable when removing hand-grease or cigarette nicotine. A brush and a wet cleaning member may be used in combination, as required. When a brush-like cleaning member is used, it is necessary to choose the length and the rigidity of brush hair so that the presence of the brush does not interfere with the removal or the insertion of the disk 5. Where a wet cleaning member is used, it is necessary to chose the viscosity and the rigidity so as to avoid interference with the removal and insertion of the disk 5.

While the above description has dealt with the application of the cleaning member to the conventional arrangement shown in FIG. 34 to FIG. 38, it should be understood that such cleaning member is also applicable to any one of the first to the fifth embodiments.

Seventh Embodiment

Figure 24:
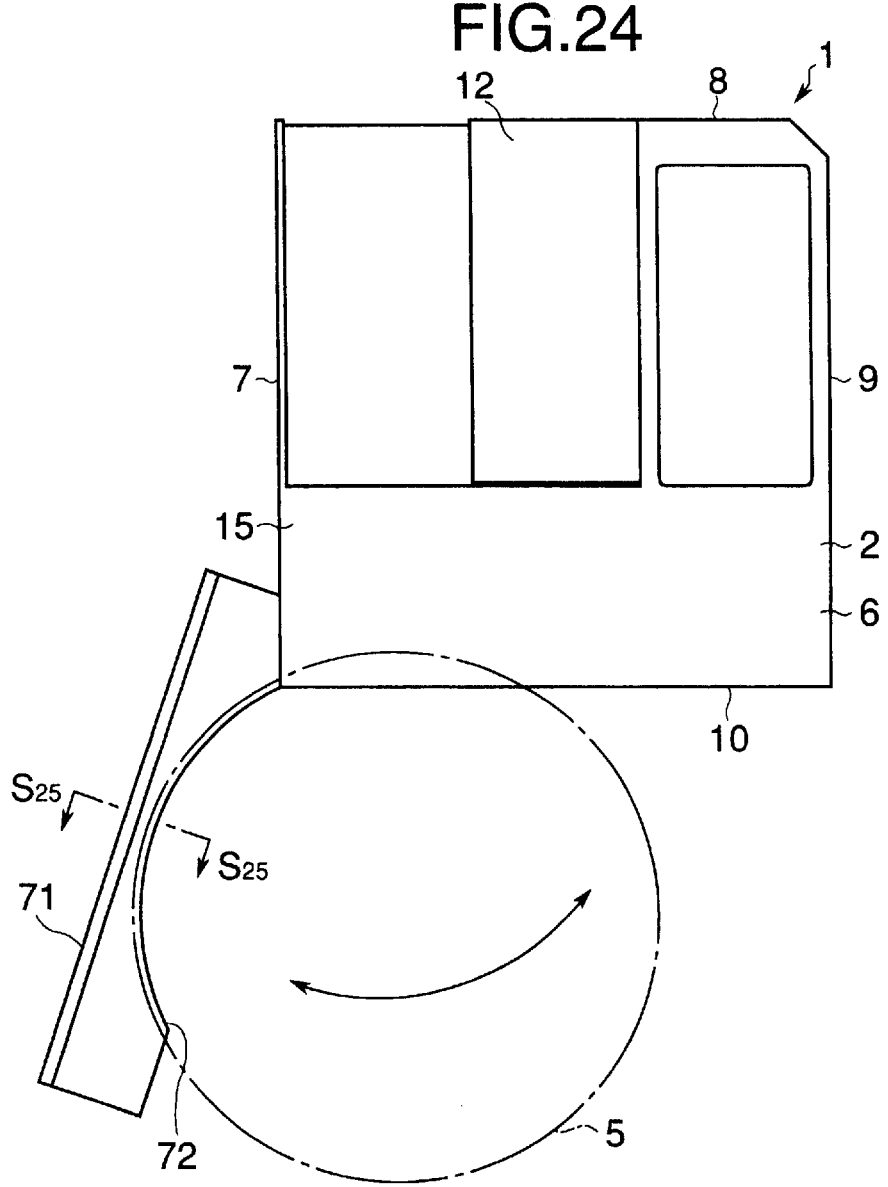
FIG. 24 is a plan view schematically illustrating the configuration of a disk cartridge according to a seventh embodiment of the present invention.
Figure 25:
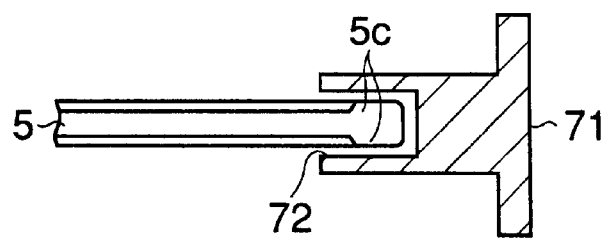
FIG. 25 is an enlarged cross section of the disk cartridge shown in FIG. 24 taken along the line $S_{25}$—$S_{25}$.

FIG. 24 is a plan view schematically illustrating the configuration of a disk cartridge according to a seventh embodiment of the present invention, and FIG. 25 is an enlarged cross section of the disk cartridge shown in FIG. 24 taken along the line $S_{25}$—$S_{25}$.

Throughout FIG. 24 and FIG. 25, parts identical or corresponding to those used in the conventional arrangement shown in FIG. 34 to FIG. 38 are designated by the same reference numerals and characters as used before.

Referring to FIG. 24 and FIG. 25, the disk cartridge according to the seventh embodiment includes a lid 71, which is formed around its inner periphery with a clamping groove 72 capable of fitting the outer periphery of the disk 5 therein. The clamping groove 72 has a width which is greater than the thickness of the rim 5c extending around the outer periphery of the disk 5.

When the disk 5 is to be received in the case 1, the disk 5 is fitted into the clamping groove 72 initially, and then the lid 71 is closed. This allows the disk 5 to be contained in a space 4 defined within the case 1 while being guided by the clamping groove 72. A minimum width of the clamping groove 72 is chosen to avoid its contact with the disk 5 as contained within the case 1 if it is rotating with a surface oscillation. A maximum width of the clamping groove 72 is chosen to avoid a contact of the information carrying surface of the disk 5 which is fitted in the clamping groove of 72 with the internal surface of the case 1 as a result of rattling of the disk 5 when the lid 71 is closed.

By guiding the disk 5 by means of the clamping groove 72, the occurrence of the disk 5 dropping in the course of inserting it into the case 1 can be prevented. In addition, the contact of the information carrying surface of the disk 5 with the internal surface of the case 1 is avoided. Deposition of hand-grease on the information carrying surface of the disk 5, which may occur as a result of holding the disk 5 by hand in order to guide the disk 5, is also eliminated. In this manner, an inconvenience such as a failure of recording information or reading information onto or from the information carrying surface as a result of a marring of the information carrying surface by grease or like can be prevented. While the above description deals with the application of the clamping groove to the conventional arrangement shown in FIG. 34 to FIG. 38, it should be understood that the provision of the clamping groove is also applicable to any one of the first to the sixth embodiment.

Eighth Embodiment

Figure 26:
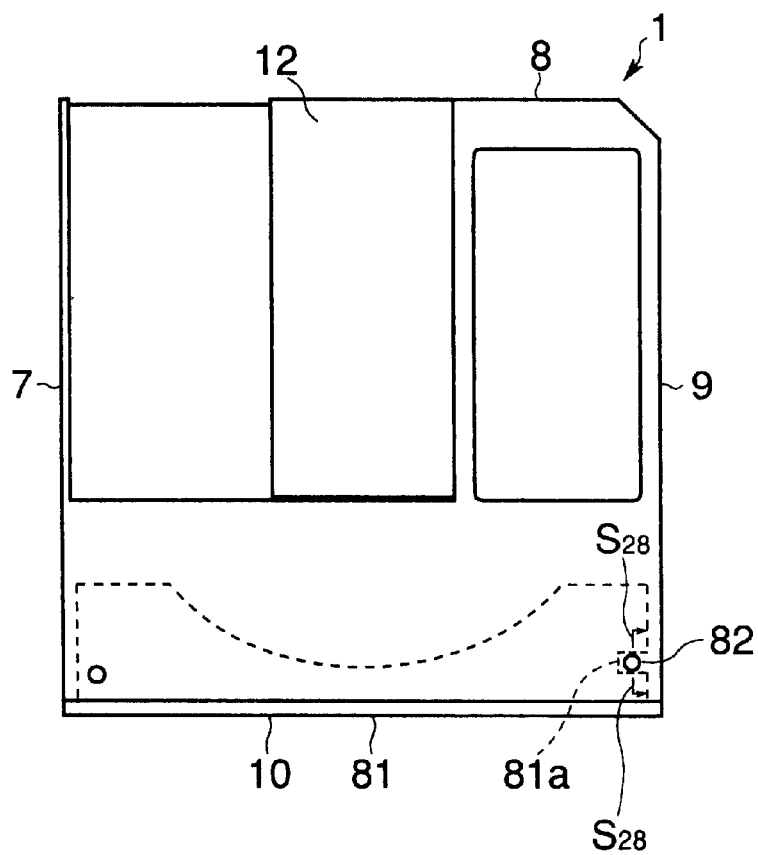
FIG. 26 is a plan view schematically illustrating the configuration of a disk cartridge according to an eighth embodiment of the present invention, when a lid is closed.
Figure 27:
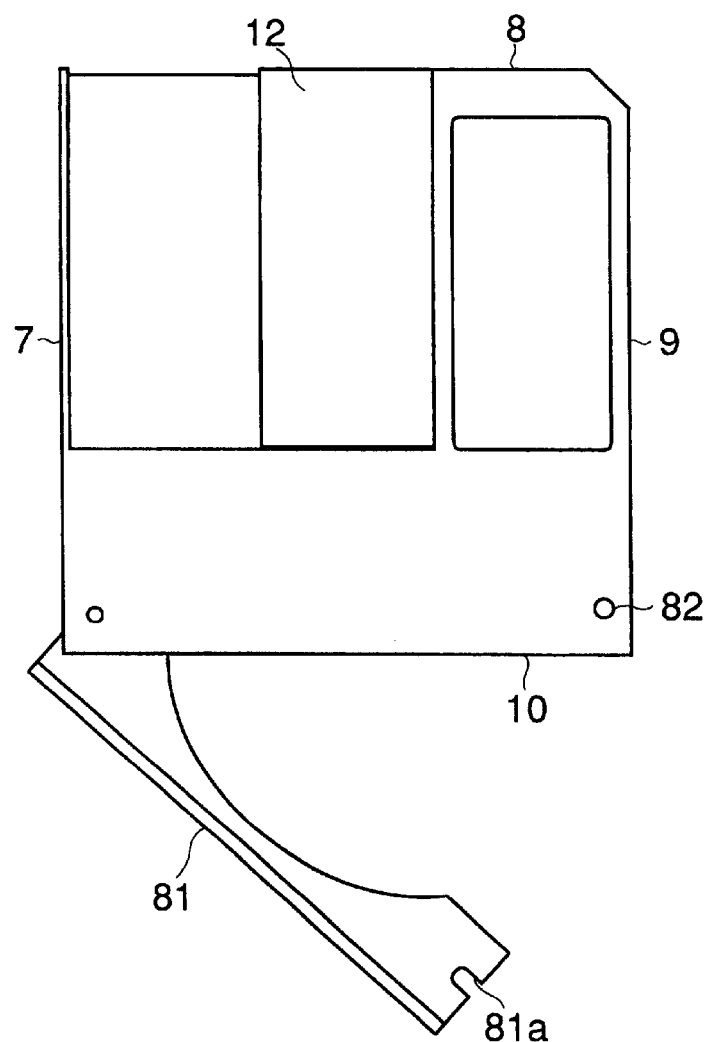
FIG. 27 Is a plan view schematically illustrating the configuration of the disk cartridge shown in FIG. 26 when the lid is opened.
Figure 28:
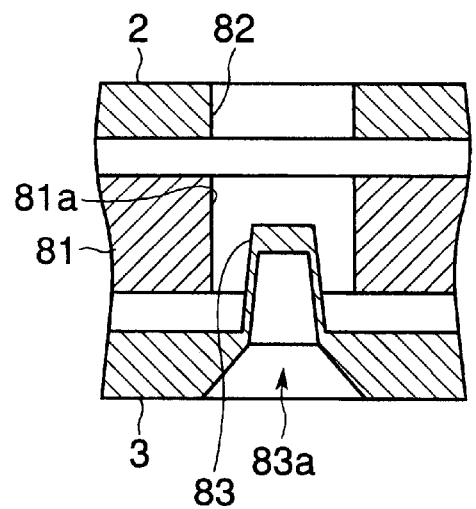
FIG. 28 is an enlarged cross section of the disk cartridge shown in FIG. 26 taken along the line $S_{28}$—$S_{28}$.
Figure 29:
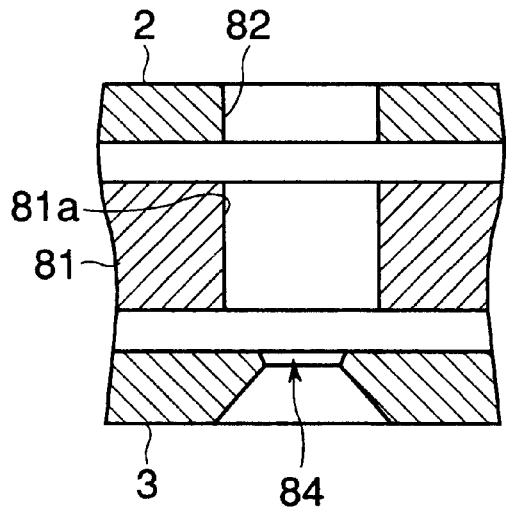
FIG. 29 is an enlarged cross section illustrating a condition in which the lid is once opened and is then closed.

FIG. 26 is a plan view schematically illustrating the configuration of a disk cartridge according to an eighth embodiment of the present invention when a lid is closed, FIG. 27 is a plan view schematically illustrating the configuration of the disk cartridge shown in FIG. 26 when the lid is opened, FIG. 28 Is an enlarged cross section of the disk cartridge shown in FIG. 26 taken along the line $S_{28}$—$S_{28}$, and FIG. 29 is an enlarged cross section illustrating a condition in which a lid is once opened and is then closed.

Throughout FIG. 26 to FIG. 29, parts identical or corresponding to those used in the conventional arrangement shown in FIG. 34 to FIG. 38 are designated by the same reference numerals and characters as used before.

The disk cartridge according to the eighth embodiment differs from the conventional disk cartridge shown in FIG.

Figure 38:
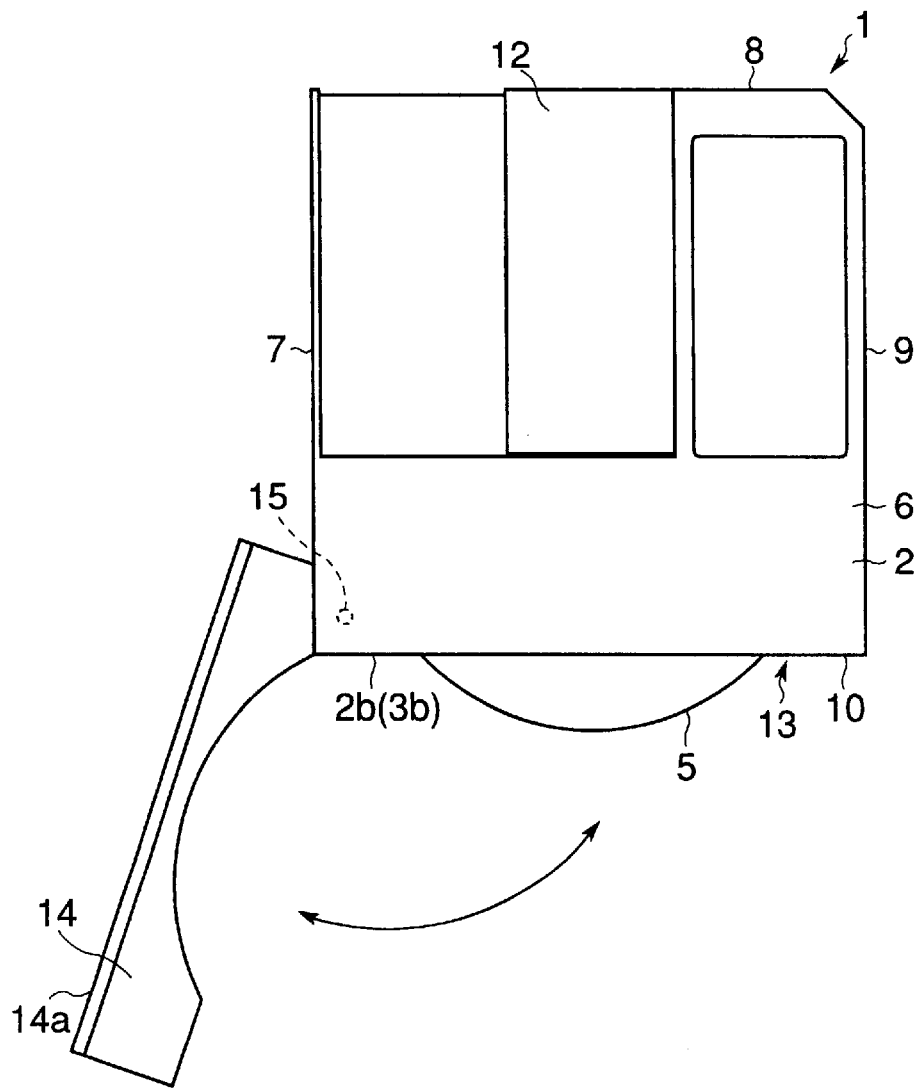
FIG. 38 is a plan view illustrating a manner of removing the disk from the disk cartridge shown in FIG. 34 by opening the lid of the disk cartridge.

34 to FIG. 38 only with respect to a detector which detects whether a lid 81 has ever been opened.

Referring to FIG. 26 to FIG. 29, the disk cartridge includes a detection aperture 82 formed to extent through the upper member 2. An identification tab 83 is formed on a lower member 3 at the location which is disposed opposite to the detection aperture 82. A relieved part 83a is formed around the root of the identification tab 83 in order to avoid a reduction in the strength of the case 1. A lid 81 is formed with a notch 81a in surrounding relationship. with the identification tab 83.

During the manufacture of the disk cartridge, the identification tab 83 connected to the lower member 3 is located within the notch 81a formed in the lid 81, as shown in FIG. 28. By detecting the presence of the identification tab 83 through the detection aperture 82, it is possible to recognize that the lid 81 has never been opened since the purchase of the disk cartridge.

When it is attempted to open the lid 81 to remove the disk from the case 1, the wall of the notch 81a which is formed in the lid 81 strikes the identification tab 83, which is then broken from its root. However, the severed identification tab 83 remains held in the notch 81a to move as the lid 81 is rotated and then falls down to be discharged outside when the notch 81a is brought to the outside of the case 1. Thus, the identification tab 83, which is once broken and brought to the outside of the case 1, cannot be returned to its original position, and cannot be restored into a space 4 within the case 1.

As shown in FIG. 29, another detection aperture 84 is formed at the location where the identification tab 83 on the lower member 3 is originally provided, the aperture 84 extending through the lower member 3. It will be noted that the detection aperture 84 is formed at the location aligned with the detection aperture 82 initially formed in the upper member 2. In this manner, where the identification tab 83 is broken and removed, the detection apertures 82 and 84 are formed to extend through both the upper and the lower members 2 and 3. If the lid 81 is closed again, the detection apertures 82 and 84 cannot be blocked, maintaining a continuously extending aperture.

When a light emitting element (not shown) is disposed on the side of the upper member 2 in a record/playback unit which is used to record information on the disk contained in the disk cartridge which is loaded therein while a light receiving elements (not shown) is disposed on the side of the lower member 3, it follows that a failure of detecting light by the light receiving element indicates the presence of the identification tab 83 which remains in place without being broken. In other words, it can be detected that the lid 81 has never been opened in the disk cartridge which is loaded. However, if the light receiving elements detects light, this indicates that the light identification tab 83 has been broken, forming a detection aperture 84. In other words, the lid 81 of the loaded disk cartridge has been opened at least once. In this manner, the record/playback unit is capable of detecting whether the disk has never been removed from the case 1 or has been removed therefrom at least once.

When recording information on the disk which has been removed from the case 1 at least once, it is necessary to verify the format of the disk in order to determine whether a normal recording operation is possible with the disk which is contained within the disk cartridge. If a technique is employed to apply a record to the disk indicating a history of removal from the case 1 and to read such record in order to determine the need to verify the format by reading information which is once recorded on the disk, it will be seen that a length of time is required before a record operation can be initiated. However, if the detection apertures 82 and 84 are formed which continue from one to the other of the members when the identification tab 83 is used according to the present invention, the need to verify the format is immediately determined upon loading the disk cartridge in the record/playback unit, thus eliminating or minimizing the length of time required before the record operation can be initiated. In this manner, a length of time required to complete the record operation can be reduced.

It will be noted that in place of the construction shown in FIG. 26 to FIG. 29, any construction can be used for the identification tab 83 which can be broken from its root with a force of a magnitude which is produced when opening the lid 81 by hand, such as a thin pin which is not provided with a relieved fillet.

While the above description deals with the use of the detection aperture and identification tab 83 in the conventional arrangement shown in FIG. 34 to FIG. 38, it should be understood that such detection aperture and the identification tab 83 can also be applied to any one of the first to the seventh embodiments.

Ninth Embodiment

Figure 30:
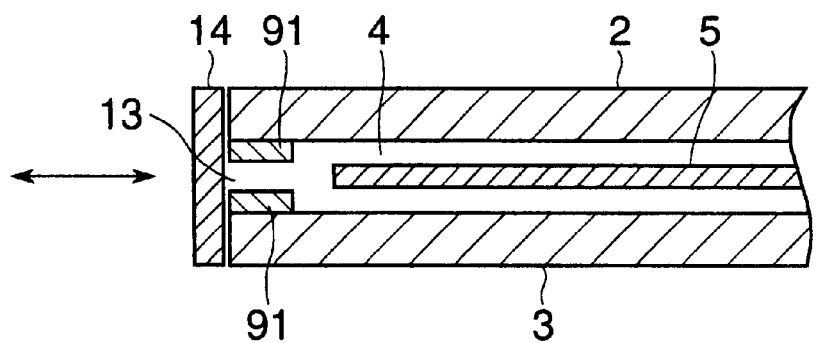
FIG. 30 is a cross section schematically illustrating the configuration of a disk cartridge according to a ninth embodiment of the present invention.
Figure 31:
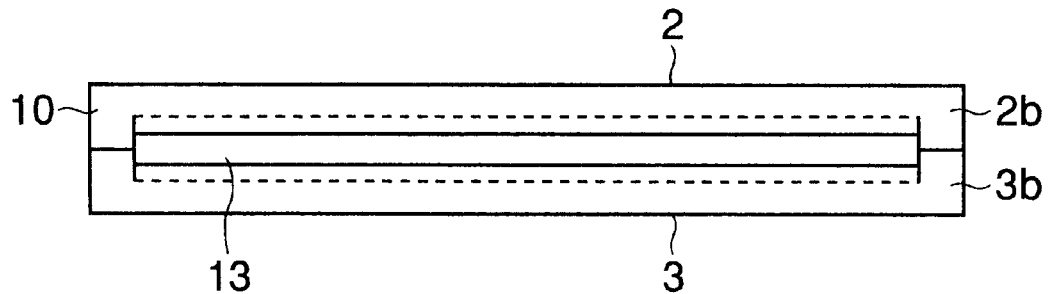
FIG. 31 is a side elevation illustrating a wall in which the disk cartridge of FIG. 30 is provided with an opening.

FIG. 30 is a cross section schematically illustrating the configuration of a disk cartridge according to a ninth embodiment of the present invention, and FIG. 31 is a side elevation illustrating a wall in which the disk cartridge of FIG. 30 is provided with an opening.

In FIG. 30 and FIG. 31, parts identical or corresponding to those used in the conventional arrangement shown in FIG. 34 to FIG. 38 are designated by the same reference numeral and characters as used before.

Referring to FIG. 30 and FIG. 31, the disk cartridge according to the ninth embodiment differs from the conventional arrangement shown in FIG. 34 to FIG. 38 only with respect to the projections 91 on the internal surfaces which define an opening 13, thus reducing the width of the opening 13. The width of the opening 13 is chosen to be substantially equal to the thickness of the disk 5 as long as it permits the disk 5 to be inserted or removed. The disk cartridge thus constructed is capable of preventing the insertion of a foreign matter such as a disk of a different type, for example, which may be inserted into the disk cartridge.

Figure 32:
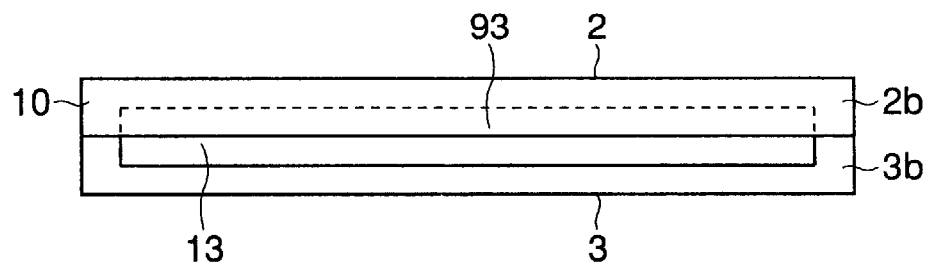
FIG. 32 is a side elevation of a modification of the ninth embodiment shown in FIG. 30 and FIG. 31.

FIG. 32 shows a modification of the ninth embodiment in that a projection 93 is provided only one of the internal surfaces which define the opening 13.

Figure 33:
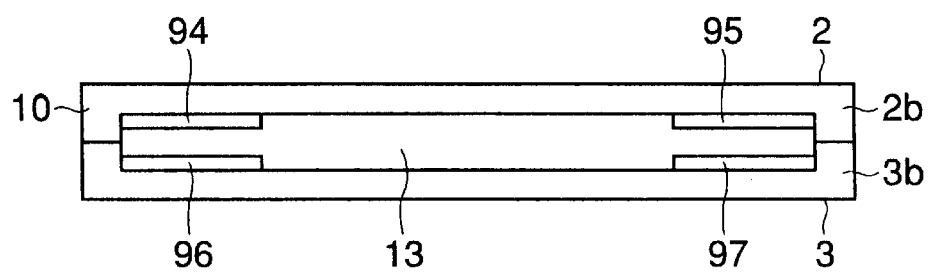
FIG. 33 is a side elevation of another modification of the ninth embodiment.
Figure 34:
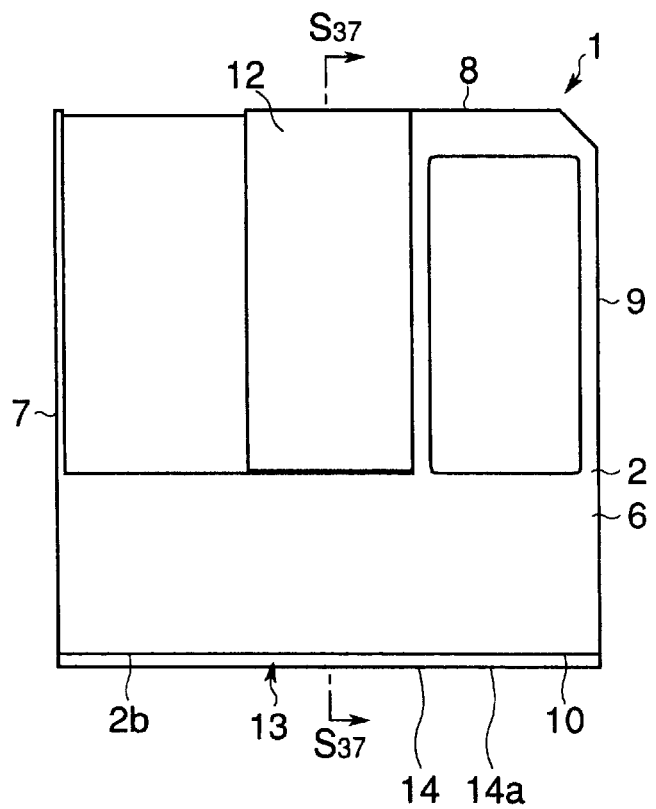
FIG. 34 is a plan view of an upper side of a conventional disk cartridge (corresponding to an A-side of the disk)
Figure 35:
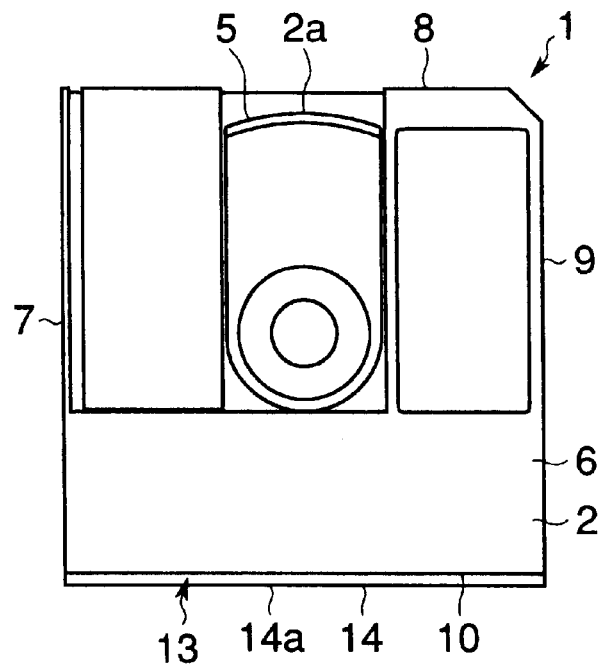
FIG. 35 is a plan view of the upper side, illustrating a manner of opening a shutter of the disk cartridge shown in FIG. 34.
Figure 36:
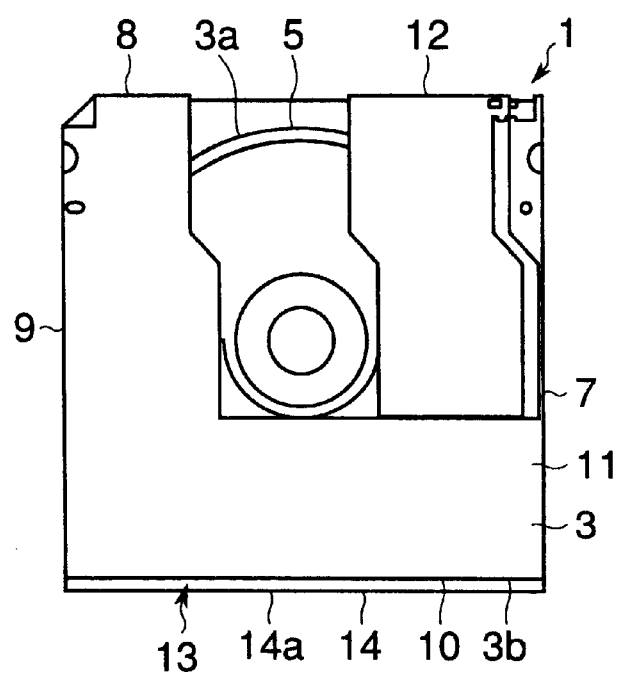
FIG. 36 is a plan view of a lower side (corresponding to a B-side of the disk), illustrating the manner of opening a shutter of the disk cartridge shown in FIG. 34.
Figure 37:
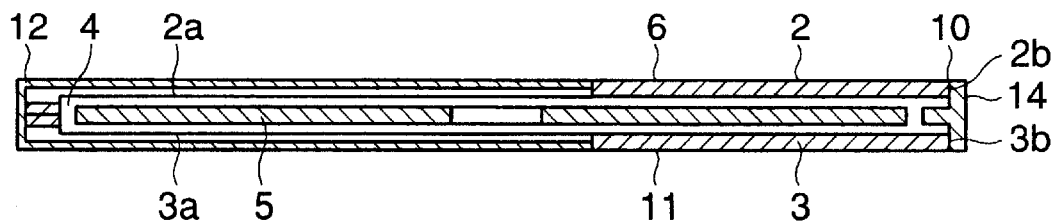
FIG. 37 is a cross section of the disk cartridge shown in FIG. 34 taken along the line $S_{37}$—$S_{37}$ shown in FIG. 34.

FIG. 33 shows another modification of the ninth embodiment in that projections 94 to 97 are provided at four corners of the internal surfaces defining the opening 13.

It is to be understood that while the use of the projections has been illustrated in connection with the conventional arrangement shown in FIG. 34 to FIG. 38, the use of such projections is also applicable to any one of the first to the eighth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk cartridge comprising:
   a case including a first planar portion and a second planar portion which are disposed opposite to each other with a given spacing therebetween, and a plurality of walls which join said first planar portion and said second planar portion together, said case containing an information carrying disk and having an opening formed in one of said plurality of walls through which the disk can be inserted or removed;

a lid mounted on said case for opening or closing the opening; and a support for supporting said lid so said lid is capable of rotating in a plane parallel to said first planar portion and said second planar portion;

said lid including a first projection provided on an inner surface of said lid on a side of the first planar portion and a second projection provided on the inner surface of said lid on a side of the second planar portion, thereby permitting an outer periphery of the disk to be fitted between the first projection and the second projection when the lid is opened, and holding the disk between the first projection and the second projection when the lid is closed, so that the disk is inserted into the case, the inner surface of the lid facing in a direction of insertion of the disk when the lid is closed, the first projection and the second projection projecting from the inner surface of the lid in a direction of insertion of the disk when the lid is closed.

2. A disk cartridge comprising:

a case including a first planar portion and a second planar portion which are disposed opposite to each other with a given spacing therebetween, and a plurality of walls which join said first planar portion and said second planar portion together, said case containing an information carrying disk, having a first opening through which information transfer may be conducted with said disk and a second opening formed in one of said plurality of walls through which the disk can be inserted or removed;

a lid mounted on said case for opening or closing the second opening;

said second planar portion including a penetration area;

a non-replaceable projection being integrally formed as a part of said first planar portion, projecting from an inside of said case and having a smaller diameter than the penetration area; and said lid including a recess for engaging said projection when said lid is closed and operable to sever said projection when said lid is opened, thereby causing said projection to be discharged outside said case through the penetration area and causing said first planar portion to be partially deformed;

the absence of said non-replaceable projection establishing the likelihood of failure of information transfer.

3. In a disk recording system with a case that may house a disk during information transfer with said disk, a method of detecting whether said disk case has been opened after initial closure comprising:

a) providing a case having an opening and a cover intended for selective opening by a user to enable removal of said disk therefrom; and b) providing a frangible element as an integral and non-replaceable part of said case so that said frangible element must be broken out of said case to open said case after initial closure;

c) indicating whether said case has ever been opened after initial closure by the presence of said frangible element in said case; thereby establishing the likelihood of failure of information transfer.

4. The method of claim 3 wherein the frangible element provided in said step b) is located in a sensor hole.

5. The method of claim 3 further comprising sensing the presence of said frangible element within said cartridge when said cartridge is inserted into a device intended for reading or writing data therefrom to determine the likelihood of failure of information transfer.

6. A disk case for use in housing a disk, including during information transfer, comprising:

a first opening enabling information transfer with said disk while in said case;

a second opening allowing selective removal of said disk from said case for information transfer with said disk without said case;

a frangible element integrally and non-replaceably provided as part of said case and positioned to prevent opening of said case after initial closure without first breaking said frangible element;

said frangible element, when broken, indicating that said case has been opened to remove said disk; thereby establishing the likelihood of failure of information transfer.

7. The disk case of claim 6 wherein said disk case houses an information storage disk to form a disk storage system.

8. The disk case of claim 6 the frangible element is provided in a sensor hole.

9. The disk case of claim of claim 6 wherein the likelihood of failure of information transfer is due to possible contamination of said disk.

10. The method of claim 5 wherein said step of detecting is performed by an optical sensor.

* * * * *